US012704624B2

(12) United States Patent
Jing et al.

(10) Patent No.: US 12,704,624 B2
(45) Date of Patent: Aug. 11, 2026

(54) SIGNAL PROCESSING METHOD AND APPARATUS

(71) Applicant: Yinwang Intelligent Technologies Co., Ltd., Shenzhen (CN)

(72) Inventors: Guobin Jing, Shanghai (CN); Bin Hu, Beijing (CN); Jing Yang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 359 days.

(21) Appl. No.: 18/171,036

(22) Filed: Feb. 17, 2023

(65) Prior Publication Data

US 2023/0194660 A1 Jun. 22, 2023

Related U.S. Application Data

(63) Continuation of application No. PCT/CN2021/098191, filed on Jun. 3, 2021.

(30) Foreign Application Priority Data

Aug. 19, 2020 (CN) ......................... 202010838331.8

(51) Int. Cl.

| | |
|---|---|
| ***G01S 13/89*** | (2006.01) |
| ***G01S 7/40*** | (2006.01) |
| *G01S 13/90* | (2006.01) |

(52) U.S. Cl.

CPC ................ *G01S 13/89* (2013.01); *G01S 7/40* (2013.01); *G01S 13/9021* (2019.05)

(58) Field of Classification Search

CPC ... G01S 7/40; G01S 13/89; G01S 13/90–9094

See application file for complete search history.

(56) References Cited

FOREIGN PATENT DOCUMENTS

| | | | | |
|---|---|---|---|---|
| CN | 103954938 B | * | 2/2017 | ......... G01S 13/9017 |
| CN | 104635221 B | * | 3/2017 | ............... G01S 7/41 |

(Continued)

OTHER PUBLICATIONS

J. G. Bin, G. Sun, M. Xing, Z. Bao, J. Sheng and Y. Liu, "A unified error estimation method for multi-modes SF-SAR in bandwidth synthesis processing," EUSAR 2018; 12th European Conference on Synthetic Aperture Radar, Aachen, Germany, 2018, pp. 1-6. (Year: 2018).*

(Continued)

*Primary Examiner* — Matthew M Barker

(74) *Attorney, Agent, or Firm* — Fish & Richardson P.C.

(57) ABSTRACT

This application discloses signal processing methods and apparatuses, in the field of radar technologies, and may be applied to scenarios such as intelligent transportation (for example, intelligent transportation, assisted driving, or autonomous driving), a smart home, and a robot. In an example method, a first range time-domain signal of a first subband and a second range time-domain signal of a second subband adjacent to the first subband are obtained. The first range time-domain signal and the second range time-domain signal are synthesized and superposed to obtain a third range time-domain signal. A first peak point and a second peak point of the third range time-domain signal are obtained. A constant phase error $\theta_{err}$ between the first range time-domain signal and the second range time-domain signal is obtained based on the first peak point and the second peak point.

20 Claims, 11 Drawing Sheets

(56) References Cited

FOREIGN PATENT DOCUMENTS

| | | | | | |
|---|---|---|---|---|---|
| CN | 106338731 B | * | 8/2019 | ........... | G01S 13/003 |
| CN | 110609273 A | * | 12/2019 | ............. | G01S 13/02 |
| KR | 20200010622 A | * | 2/2017 | ........... | G01S 13/904 |

OTHER PUBLICATIONS

CN 103954938 Translation (Year: 2017).*
CN 104635221 Translation (Year: 2017).*
CN 106338731 Translation (Year: 2019).*
CN 110609273 Translation (Year: 2019).*
KR 20200010622 Translation (Year: 2020).*
Jing et al., "A Novel Two-Step Approach of Error Estimation for Stepped-Frequency MIMO-SAR," IEEE Geoscience and Remote Sensing Letters, vol. 14, No. 12, Dec. 1, 2017, pp. 2290-2294.
Extended European Search Report in European Appln No. 21857283.2, dated Dec. 22, 2023, 7 pages.

* cited by examiner (a)

(b)

SIGNAL PROCESSING METHOD AND APPARATUS

CROSS-REFERENCE TO RELATED APPLICATIONS

This application is a continuation of International Application No. PCT/CN2021/098191, filed on Jun. 3, 2021, which claims priority to Chinese Patent Application No. 202010838331.8, filed on Aug. 19, 2020. The disclosures of the aforementioned applications are hereby incorporated by reference in their entireties.

TECHNICAL FIELD

This application relates to the field of radar technologies, and more specifically, to a signal processing method and apparatus.

BACKGROUND

With development of society, intelligent transportation, a smart home, a smart robot, and the like are gradually entering peoples daily life. Sensors play a very important role in various intelligent electronic devices. Various radar sensors such as a millimeter wave radar, a laser radar, and an ultrasonic radar installed on the intelligent electronic devices can be configured to detect and identify a target, for example, sense an ambient environment, identify and track a moving object, and identify a static scenario. The sensors can improve an environment awareness capability of the intelligent electronic devices, and implement the intelligent transportation, the smart home, the smart robot, and the like.

In a radar system, high-resolution target detection and identification may be implemented based on an imaging result of a high-resolution radar, for example, a high-resolution synthetic aperture radar (synthetic aperture radar, SAR). The radar may implement a high range resolution by transmitting an ultra-wideband chirp signal. Usually, a high range resolution of 0.05 m corresponds to a radar transmission bandwidth of 3 GHz or more. In a direct collection and receiving mode, a radar echo frequency-response characteristic obtained by using an ultra-wideband signal is not ideal, and more amplitude and phase errors are introduced, making it difficult to implement an ideal pulse compression result. Therefore, to transmit an ultra-wideband signal above 3 GHz, a high ambient requirement of the radar system and high linearity of a large bandwidth signal need to be ensured. In addition, when a receiver directly receives such a large bandwidth signal, an ultra-high-speed analog-to-digital (A/D) converter and a memory are needed. This puts great pressure on in-phase quadrature (I/Q) detection of a receiving apparatus, and increases complexity and costs of the system.

Based on actual complexity and costs of the system, step frequency signals of a plurality of subbands can be synthesized into an ultra-wideband signal, to implement imaging with a high range resolution. In a multi-subband radar system, phase mismatch between subband signals leads to deterioration of a range impulse response, which affects an effect of subband coherent synthesis. Bandwidth distribution modes of the plurality of subbands include a subband overlapping mode, a subband adjacent mode, and a subband spacing mode. Currently, interference phase extraction may be performed on a common part of overlapping subbands in the subband overlapping mode to estimate a phase error between subband signals, and compensation is performed based on the phase error to implement subband splicing. However, according to this solution, subband splicing cannot be implemented in the subband adjacent mode and the subband spacing mode. Therefore, a bandwidth synthesis solution applicable to three modes such as the subband overlapping mode, the subband adjacent mode, and the subband spacing mode is urgently needed.

SUMMARY

This application provides a signal processing method and apparatus, to implement subband splicing in a subband overlapping mode, a subband adjacent mode, and a subband spacing mode.

According to a first aspect, a signal processing method is provided, including:

- obtaining a first range time-domain signal of a first subband and a second range time-domain signal of a second subband adjacent to the first subband;
- synthesizing and superposing the first range time-domain signal and the second range time-domain signal to obtain a third range time-domain signal;
- obtaining a first peak point and a second peak point of the third range time-domain signal; and
- determining a constant phase error $\theta_{err}$ between the first range time-domain signal and the second range time-domain signal based on the first peak point and the second peak point, where $\theta_{err} \in [0,2\pi]$.

Therefore, in this embodiment of this application, range time-domain signals of adjacent subbands are synthesized and superposed to obtain a spliced synthetic bandwidth signal, and two peak points, for example, a first peak point and a second peak point, in the spliced synthetic bandwidth signal. Because the two peak points in the synthetic bandwidth signal are related to a constant phase between the two adjacent subbands before splicing, a constant phase error between the adjacent subbands can be obtained based on the two peak points in this embodiment of this application. In this embodiment of this application, because a process of determining the constant phase error does not relate to a common spectrum part of an overlapping subband of adjacent subbands, spectrum utilization can be improved and three modes are applicable: a subband overlapping mode, a subband adjacent mode, and a subband spacing mode.

With reference to the first aspect, in some implementations of the first aspect, the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal. In other words, the second peak point is a peak point corresponding to a second peak in the third range time-domain signal.

The determining a constant phase error $\theta_{err}$ between the first range time-domain signal and the second range time-domain signal based on the first peak point and the second peak point includes:

- determining a residual constant phase error $\Delta\theta$ of the third range time-domain signal based on a difference between the first peak point and the second peak point, where the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and determining the constant phase error $\theta_{err}$ based on the residual constant phase error $\Delta\theta$ and the first compensation value $\theta$.

There is a mapping relationship between the residual constant phase error $\Delta\theta$ and the difference between the first peak point and the second peak point. Because there is also a mapping relationship between the residual constant phase error $\Delta\theta$ and the constant phase error $\theta_{err}$, there is also a mapping relationship between the constant phase error $\theta_{err}$ and the difference between the first peak point and the second peak point. Herein, the mapping relationship between the constant phase error $\theta_{err}$ and the difference between the first peak point and the second peak point may be referred to as a main lobe splitting operation model.

Therefore, in this embodiment of this application, a difference between a main lobe and a first side lobe (namely, a side lobe corresponding to the second peak) in the synthetic bandwidth signal is obtained, and a constant phase error $\theta_{err}$ between subbands is obtained based on a mapping relationship between the residual constant phase error $\Delta\theta$ and the difference between the main lobe and the first side lobe in the synthetic bandwidth signal, and the mapping relationship between the residual constant phase error $\Delta\theta$ and the constant phase error $\theta_{err}$, that is, based on a splitting main lobe inverse-operation model.

With reference to the first aspect, in some implementations of the first aspect, when the peak point corresponding to the first side lobe is on the left side of the peak point corresponding to the main lobe, a value range of the residual constant phase error $\Delta\theta$ is $[0,\pi]$. In other words, the first side lobe is a left adjacent side lobe of the main lobe.

When the peak point corresponding to the first side lobe is on the right side of the peak point corresponding to the main lobe, a value range of the residual constant phase error $\Delta\theta$ is $[\pi, 2\pi]$. In other words, the first side lobe is a right adjacent side lobe of the main lobe.

In this way, the value range of the residual constant phase error $\Delta\theta$ may be further obtained based on a location of the first side lobe relative to the main lobe, that is, the first side lobe is a left adjacent side lobe or a right adjacent side lobe, to more accurately determine a corresponding residual constant phase error $\Delta\theta$ based on a difference between a peak point of the main lobe and a peak point of the first side lobe.

With reference to the first aspect, in some implementations of the first aspect, the determining a residual constant phase error $\Delta\theta$ of the third range time-domain signal based on a difference between the first peak point and the second peak point includes:

when a difference between the peak point corresponding to the main lobe of the third range time-domain signal and the peak point corresponding to the first side lobe is a minimum value, determining that the residual constant phase error $\Delta\theta$ is $\pi$. Herein, the minimum value of the difference includes that the difference is 0 and the difference is approximately 0. This is not limited in this embodiment of this application.

Therefore, in this embodiment of this application, the minimum value (that is, 0 or approximately 0) of the difference between the main lobe and the first side lobe in the synthetic bandwidth signal is obtained, and when the difference between the main lobe and the first side lobe in the synthetic bandwidth signal is the minimum value, the residual constant phase error $\Delta\theta$ is $\pi$. In this case, $\theta_{err}=\theta-\pi$. The constant phase error $\theta_{err}$ between subbands may be obtained by substituting a compensation value $\theta$ corresponding to the synthetic bandwidth signal.

With reference to the first aspect, in some implementations of the first aspect, the first range time-domain signal is represented by the following formula:

$$R_i(t_q) = \mathrm{sinc}(\gamma T t_q) e^{-j\pi\gamma T t_q}$$

The second range time-domain signal is represented by the following formula:

$$R_{i+1}(t_q) = \mathrm{sinc}(\gamma T t_q) e^{j\pi\gamma T t_q} e^{j\theta err}$$

The third range time-domain signal is shown in the following formula:

$$R_d(t_q;\theta) = \left(1 + e^{j(\theta-\theta_{err})}\right)\cdot r_1(t_q) - j\cdot\left(1 - e^{j(\theta-\theta_{err})}\right)\cdot r_2(t_q)$$

$r_1(t_q)=\sin c(2\gamma T t_q)$, $r_2(t_q)=\sin c(\gamma T t_q)\sin(\pi\gamma T t_q)$, $R_d(t_q;\theta)$ represents the third range time-domain signal, $R_i(t_q)$ represents a range time-domain signal of an $i^{th}$ subband at a range moment $t_q$, $i\in[1, I]$, I represents a quantity of subbands on which bandwidth synthesis needs to be performed, $q\in[1, Q]$ represents a range discrete sampling moment, Q represents a total range discrete sampling moment, $\sin c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

With reference to the first aspect, in some implementations of the first aspect, the first peak point is a peak point corresponding to a left adjacent side lobe of a main lobe of the third range time-domain signal, and the second peak point is a peak point corresponding to a right adjacent side lobe of the main lobe of the third range time-domain signal.

The determining a constant phase error $\theta_{err}$ between the first range time-domain signal and the second range time-domain signal based on the first peak point and the second peak point includes:

determining the constant phase error $\theta_{err}$ based on a difference between the first peak point and the second peak point and a first mapping relationship between the difference and the constant phase error $\theta_{err}$.

Herein, the first mapping relationship between the constant phase error and the difference between the first peak point and the second peak point may be referred to as a left-right side lobe equalization model.

Therefore, in this embodiment of this application, after a difference between the left adjacent side lobe and the right adjacent side lobe of the main lobe in the synthetic bandwidth signal is obtained, the constant phase error $\theta_{err}$ between subbands is obtained based on a mapping relationship between the difference between the left adjacent side lobe and the right adjacent side lobe of the main lobe in the synthetic bandwidth signal and the constant phase error $\theta_{err}$ between adjacent subbands, that is, based on a left-right side lobe equalization model.

With reference to the first aspect, in some implementations of the first aspect, before the determining a constant phase error $\theta_{err}$ between the first range time-domain signal and the second range time-domain signal based on the first peak point and the second peak point, the method further includes:

obtaining a second mapping relationship between the left adjacent side lobe of the main lobe and the constant phase error $\theta_{err}$;

obtaining a third mapping relationship between the right adjacent side lobe of the main lobe and the constant phase error $\theta_{err}$; and determining the first mapping relationship based on the first mapping relationship and the second mapping relationship.

Therefore, in this embodiment of this application, after the third range time-domain signal is obtained, the second mapping relationship between the left adjacent side lobe of the main lobe of the third range time-domain signal and the constant phase error $\theta_{err}$ and the third mapping relationship between the right adjacent side lobe of the main lobe of the third range time-domain signal and the constant phase error $\theta_{err}$ may be separately obtained. Then, the first mapping relationship is determined based on the second mapping relationship and the third mapping relationship.

With reference to the first aspect, in some implementations of the first aspect, the first mapping relationship is shown in the following formula:

$$\theta_{err} = \frac{P(\theta_{err})}{|P(\theta_{err})|} \cdot \arccos\left(1 - \frac{9\pi^2}{32} P^2(\theta_{err})\right)$$

$P(\theta_{err})$ represents the difference between the first peak point and the second peak point.

With reference to the first aspect, in some implementations of the first aspect, the first range time-domain signal is represented by the following formula:

$$R_i(t_q) = \mathrm{sinc}(\gamma T t_q) e^{-j\pi\gamma T t_q}$$

The second range time-domain signal is represented by the following formula:

$$R_{i+1}(t_q) = \mathrm{sinc}(\gamma T t_q) e^{j\pi\gamma T t_q} e^{j\theta err}$$

The third range time-domain signal is shown in the following formula:

$$Q(t_1) = R_j(t_q) + R_{j+1}(t_q) = \mathrm{sinc}(\gamma T t_q) e^{-j\pi\gamma T t_q} + \mathrm{sinc}(\gamma T t_q) e^{j\pi\gamma T t q} e^{j\theta_{err}}$$

The left adjacent side lobe $Q_l(\theta_{err})$ of the main lobe of the third range time-domain signal meets the following formula:

$$Q_l(\theta_{err}) = -\frac{2}{3\pi}(1 - j) - \frac{2}{3\pi}(1 + j)\exp(j\theta_{err})$$

The right adjacent side lobe $Q_r(\theta_{err})$ of the main lobe of the third range time-domain signal meets the following formula:

$$Q_r(\theta_{err}) = -\frac{2}{3\pi}(1 + j) - \frac{2}{3\pi}(1 - j)\exp(j\theta_{err})$$

$Q(t_q)$ represents the third range time-domain signal, $R_i(t_q)$ represents a range time-domain signal of an $i^{th}$ subband at a range moment $t_q$, $i \in [1, I]$, I represents a quantity of subbands on which bandwidth synthesis needs to be performed, $q \in [1, Q]$ represents a range discrete sampling moment, Q represents a total range discrete sampling moment, $\mathrm{sin}\ c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

With reference to the first aspect, in some implementations of the first aspect, the method further includes:

determining a constant phase error compensation function based on the constant phase error $\theta_{err}$;

compensating the first range time-domain signal or the second range time-domain signal based on the constant phase error compensation function; and synthesizing and superposing the compensated first range time-domain signal and the compensated second range time-domain signal to obtain a fourth range time-domain signal.

Therefore, in this embodiment of this application, after the constant phase error between the adjacent subbands is compensated, the adjacent subbands may be compensated based on the constant phase error, and bandwidth synthesis is performed on the compensated adjacent subbands, to obtain a radar imaging map with a high range resolution. In this embodiment of this application, because a process of determining the constant phase error does not relate to a common spectrum part of an overlapping subband of adjacent subbands, according to the bandwidth synthesis solution, spectrum utilization can be improved and three modes are applicable: a subband overlapping mode, a subband adjacent mode, and a subband spacing mode.

With reference to the first aspect, in some implementations of the first aspect, before the synthesizing and superposing the first range time-domain signal and the second range time-domain signal to obtain a third range time-domain signal, the method further includes:

separately performing channel amplitude calibration on the first range time-domain signal and the second range time-domain signal;

rearranging the first range time-domain signal and the second range time-domain signal based on a carrier frequency sequence;

separately compensating intra-subband higher-order phase errors of the first range time-domain signal and the second range time-domain signal; and compensating a first-order phase error between the first range time-domain signal and the second range time-domain signal.

In this embodiment of this application, amplitude-phase characteristics of the adjacent subbands are calibrated, signals of the adjacent subbands are rearranged based on a carrier frequency sequence, and a higher-order phase error between the adjacent subbands and a first-order phase error between the adjacent subbands are compensated, so that there is only the constant phase error between the adjacent subbands before the constant phase error between the adjacent subbands is obtained. Therefore, in this embodiment of this application, the constant phase error between the adjacent subbands can be accurately obtained based on a mapping relationship between a related peak point of a bandwidth synthesized result and the residual constant phase error.

According to a second aspect, a signal processing apparatus is provided, including:

an obtaining unit, configured to obtain a first range time-domain signal of a first subband and a second range time-domain signal of a second subband adjacent to the first subband;

a synthesizing unit, configured to synthesize and superpose the first range time-domain signal and the second range time-domain signal to obtain a third range time-domain signal, where the obtaining unit is further configured to obtain a first peak point and a second peak point of the third range time-domain signal; and a determining unit, configured to determine a constant phase error $\theta_{err}$ between the first range time-domain signal and the second range time-domain signal based on the first peak point and the second peak point, where $\theta_{err} \in [0,2\pi]$.

With reference to the second aspect, in some implementations of the second aspect, the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal.

The determining unit is specifically configured to:

determine a residual constant phase error $\Delta\theta$ of the third range time-domain signal based on a difference between the first peak point and the second peak point, where the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and determine the constant phase error $\theta_{err}$ based on the residual constant phase error $\Delta\theta$ and the first compensation value $\theta$.

With reference to the second aspect, in some implementations of the second aspect, when the peak point corresponding to the first side lobe is on the left side of the peak point corresponding to the main lobe, a value range of the residual constant phase error $\Delta\theta$ is $[0,\pi]$; or when the peak point corresponding to the first side lobe is on the right side of the peak point corresponding to the main lobe, a value range of the residual constant phase error $\Delta\theta$ is $[\pi, 2\pi]$.

With reference to the second aspect, in some implementations of the second aspect, the determining unit is specifically configured to:

when a difference between the peak point corresponding to the main lobe of the third range time-domain signal and the peak point corresponding to the first side lobe is a minimum value, determine that the residual constant phase error $\Delta\theta$ is $\pi$.

With reference to the second aspect, in some implementations of the second aspect, the first range time-domain signal is represented by the following formula:

$$R_i(t_q) = \mathrm{sinc}(\gamma \mathrm{T} t_q) e^{-j\pi\gamma \mathrm{T} t_q}$$

The second range time-domain signal is represented by the following formula:

$$R_{i+1}(t_q) = \mathrm{sinc}(\gamma T t_q) e^{j\pi\gamma T t_q} e^{j\theta_{err}}$$

The third range time-domain signal is shown in the following formula:

$$R_d(t_q;\theta) = \left(1 + e^{j(\theta-\theta_{err})}\right)\cdot r_1(t_q) - j\cdot\left(1 - e^{j(\theta-\theta_{err})}\right)\cdot r_2(t_q)$$

$r_1(t_q)=\sin c(2\gamma Tt_q)$, $r_2(t_q)=\sin c(\gamma Tt_q)\sin(\pi\gamma Tt_q)$, $R_d(t_q;\theta)$ represents the third range time-domain signal, $R_i(t_q)$ represents a range time-domain signal of an $i^{th}$ subband at a range moment $t_q$, $i\in[1, I]$, I represents a quantity of subbands on which bandwidth synthesis needs to be performed, $q\in[1, Q]$ represents a range discrete sampling moment, Q represents a total range discrete sampling moment, $\sin c(\gamma Tt_q)$ represents a signal range envelope signal, $\gamma$ represents a range chirp slope, T represents a radar transmission time period, $e^{j\pi\gamma Tt_q}$ represents signal range phase information, and $e^{j\theta_{err}}$ represents inter-subband signal range phase error information.

With reference to the second aspect, in some implementations of the second aspect, the first peak point is a peak point corresponding to a left adjacent side lobe of a main lobe of the third range time-domain signal, and the second peak point is a peak point corresponding to a right adjacent side lobe of the main lobe of the third range time-domain signal.

The determining unit is specifically configured to:

determine the constant phase error $\theta_{err}$ based on a difference between the first peak point and the second peak point and a first mapping relationship between the difference and the constant phase error $\theta_{err}$.

With reference to the second aspect, in some implementations of the second aspect, the obtaining unit is further configured to:

obtain a second mapping relationship between the left adjacent side lobe of the main lobe and the constant phase error $\theta_{err}$;

obtain a third mapping relationship between the right adjacent side lobe of the main lobe and the constant phase error $\theta_{err}$; and determine the first mapping relationship based on the first mapping relationship and the second mapping relationship.

With reference to the second aspect, in some implementations of the second aspect, the first mapping relationship is shown in the following formula:

$$\theta_{err} = \frac{P(\theta_{err})}{|P(\theta_{err})|}\cdot \arccos\left(1 - \frac{9\pi^2}{32}P^2(\theta_{err})\right)$$

$P(\theta_{err})$ represents the difference between the first peak point and the second peak point.

With reference to the second aspect, in some implementations of the second aspect, the first range time-domain signal is represented by the following formula:

$$R_i(t_q)=\mathrm{sinc}(\gamma T t_q)e^{-j\pi\gamma T t_q}$$

The second range time-domain signal is represented by the following formula:

$$R_{i+1}(t_q)=\mathrm{sinc}(\gamma T t_q)e^{j\pi\gamma T t_q}e^{j\theta_{err}}$$

The third range time-domain signal is shown in the following formula:

$$Q(t_q)=R_j(t_q)+R_{j+1}(t_q)=\mathrm{sinc}(\gamma T t_q)e^{-j\pi\gamma T t_q}+\mathrm{sinc}(\gamma T t_q)e^{j\pi\gamma T t_q}e^{j\theta_{err}}$$

The left adjacent side lobe $Q_l(\theta_{err})$ of the main lobe of the third range time-domain signal meets the following formula:

$$Q_l(\theta_{err})=-\frac{2}{3\pi}(1-j)-\frac{2}{3\pi}(1+j)\exp(j\theta_{err})$$

The right adjacent side lobe $Q_r(\theta_{err})$ of the main lobe of the third range time-domain signal meets the following formula:

$$Q_r(\theta_{err})=-\frac{2}{3\pi}(1+j)-\frac{2}{3\pi}(1-j)\exp(j\theta_{err})$$

$Q(t_q)$ represents the third range time-domain signal, $R_i(t_q)$ represents a range time-domain signal of an $i^{th}$ subband at a range moment $t_q$, $i\in[1, I]$, I represents a quantity of subbands on which bandwidth synthesis needs to be performed, $q\in[1, Q]$ represents a range discrete sampling moment, Q represents a total range discrete sampling moment, sin $c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

With reference to the second aspect, in some implementations of the second aspect, the determining unit is further configured to determine a constant phase error compensation function based on the constant phase error $\theta_{err}$.

A compensating unit is configured to compensate the first range time-domain signal or the second range time-domain signal based on the constant phase error compensation function.

The combining unit is further configured to synthesize and superpose the compensated first range time-domain signal and the compensated second range time-domain signal to obtain a fourth range time-domain signal.

With reference to the second aspect, in some implementations of the second aspect, the apparatus further includes:

a channel amplitude calibration unit, configured to separately perform channel amplitude calibration on the first range time-domain signal and the second range time-domain signal;

a spectrum shifting unit, configured to rearrange the first range time-domain signal and the second range time-domain signal based on a carrier frequency sequence;

a higher-order phase error compensation unit, configured to separately compensate intra-subband higher-order phase errors of the first range time-domain signal and the second range time-domain signal; and a first-order phase error compensation unit, configured to compensate a first-order phase error between the first range time-domain signal and the second range time-domain signal.

According to a third aspect, a signal processing apparatus is provided, including a processor. The processor is configured to execute instructions stored in a memory. When the processor executes the instructions stored in the memory, the signal processing apparatus is enabled to perform the method according to any one of the first aspect or the possible implementations of the first aspect.

Optionally, the signal processing apparatus further includes the memory.

According to a fourth aspect, a computer-readable medium is provided, and is configured to store a computer program. The computer program includes an instruction used to perform the method according to any one of the first aspect or the possible implementations of the first aspect.

According to a fifth aspect, a computer program product including an instruction is provided. When the computer program product runs on a computer, the computer is enabled to perform the method according to any one of the first aspect or the possible implementations of the first aspect.

According to a sixth aspect, a chip is provided. The chip includes a processor and a communication interface. The processor is configured to invoke instructions from the communication interface and run the instructions. When the processor executes the instructions, the method according to any one of the first aspect or the possible implementations of the first aspect is implemented.

It should be understood that, for beneficial effects achieved in the second to the sixth aspects and the corresponding implementations of this application, refer to beneficial effects achieved in the first aspect and the corresponding implementations of this application. Details are not described again.

DESCRIPTION OF EMBODIMENTS

The following describes the technical solutions of this application with reference to the accompanying drawings.

Figure 1:
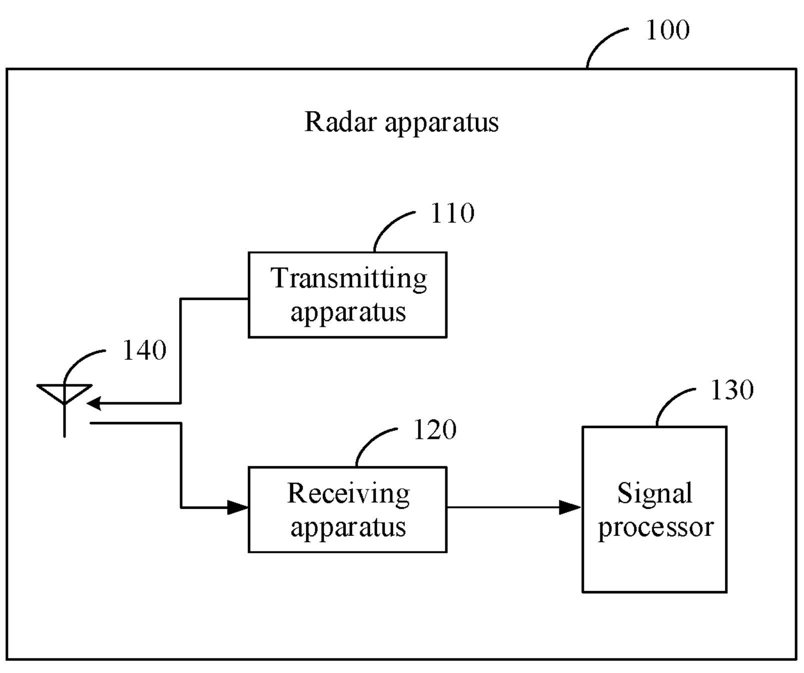
FIG. 1 is a schematic block diagram of a radar apparatus according to an embodiment of this application.

FIG. 1 is a schematic block diagram of a radar apparatus 100 applied to a signal processing method according to an embodiment of this application. For example, the radar apparatus 100 may be a millimeter wave radar, a laser radar, an ultrasonic radar, a SAR, or the like. This is not limited in this embodiment of this application. The radar apparatus 100 may be applied to intelligent scenarios such as intelligent transportation, intelligent airport foreign object detection, airborne\spaceborne radar imaging mapping, a smart home, and a smart robot.

For example, in the intelligent transportation scenario, the radar apparatus 100 may be installed on an intelligent monitoring device or an intelligent transportation device. For example, the intelligent monitoring device may be disposed on a smart intersection or a high-speed gantry crane, and may detect passing vehicles with a high resolution to implement high-performance traffic supervision. For another example, the intelligent monitoring device may be disposed on a roadside monitoring device and the intelligent transportation device to identify and track a moving object on a road, and identify a static object (for example, a lane line or a signboard), so that overall safety performance of the road is improved.

As shown in FIG. 1, the radar apparatus 100 includes at least a transmitting apparatus 110, a receiving apparatus 120, a signal processor 130, and an antenna 140. The transmitting apparatus 110 is configured to transmit a radar signal through the antenna 140. The receiving apparatus 120 is configured to receive an echo signal of the radar signal through the antenna 140. Here, the echo signal of the radar signal is a signal generated by reflecting the radar signal by a target in a detection area of the apparatus 100. The signal processor 130 is connected to the receiving apparatus 120, and is configured to perform signal processing on the echo signal.

In a possible implementation, the transmitting apparatus 110 may transmit an ultra-wideband radar wave signal, for example, an ultra-wideband chirp signal. For example, a transmit bandwidth of the radar signal may be more than 4 GHz, to obtain a radar imaging result with a high range resolution of less than 0.04 m.

In another possible implementation, the transmitting apparatus 110 may further transmit step frequency signals of a plurality of subbands. Because the step frequency signals of the plurality of subbands can be synthesized into an ultra-wideband signal, the radar imaging result with a high range resolution can also be obtained by transmitting the step frequency signals of the plurality of subbands.

Figure 2:
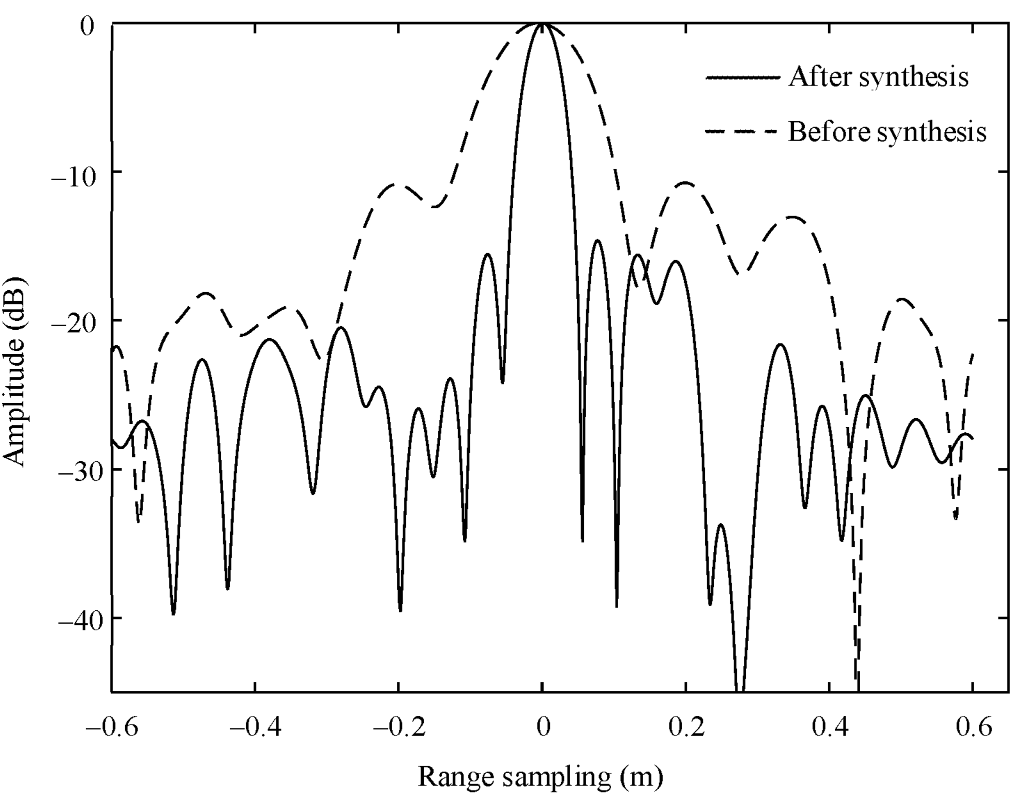
FIG. 2 shows a range profile comparison result between step frequency signals of a plurality of subbands before bandwidth synthesis is performed on the step frequency signals of the plurality of subbands and synthetic wideband signals.

In this embodiment of this application, the receiving apparatus 120 may obtain echo signals of a plurality of subbands. The echo signals of the plurality of subbands obtained by the receiving apparatus 120 can be synthesized into an ultra-wideband signal, to implement imaging with a high range resolution. FIG. 2 shows a range profile comparison result between step frequency signals of a plurality of subbands before bandwidth synthesis is performed on the step frequency signals of the plurality of subbands and synthetic wideband signals. It can be seen that a radar range resolution of a target after bandwidth synthesis is higher, and adjacent structural components in the target can be effectively separated. This facilitates target detection and identification in the later stage.

In a possible implementation, when the transmitting apparatus 110 transmits an ultra-wideband radar wave signal, the receiving apparatus 120 may receive an ultra-wideband echo signal through the antenna 140. In this case, restricted by an AD collection rate, the receiving apparatus 120 cannot directly collect a large-bandwidth signal, and may perform filtering processing on the ultra-wideband echo signal, to divide the ultra-wideband echo signal into signals of a plurality of subbands, so that the receiver may obtain the echo signals of the plurality of subbands. For example, the receiving apparatus 110 may filter the ultra-wideband echo signal by using a plurality of filters with different filtering bandwidths, to obtain the echo signals of the plurality of subbands.

In a possible implementation, when the transmitting apparatus 110 transmits step frequency signals of a plurality of subbands, the receiving apparatus 120 may receive step frequency echo signals of a plurality of subbands through the antenna 140.

In embodiments of this application, the signal processor 130 is configured to process the echo signals of the plurality of subbands obtained by the receiving apparatus 120, for example, perform intra-subband phase error estimation and compensation, inter-subband phase error estimation and compensation, or coherent synthesis and radar imaging on the echo signals of the plurality of subbands. This is not limited in embodiments of this application.

Figure 3:
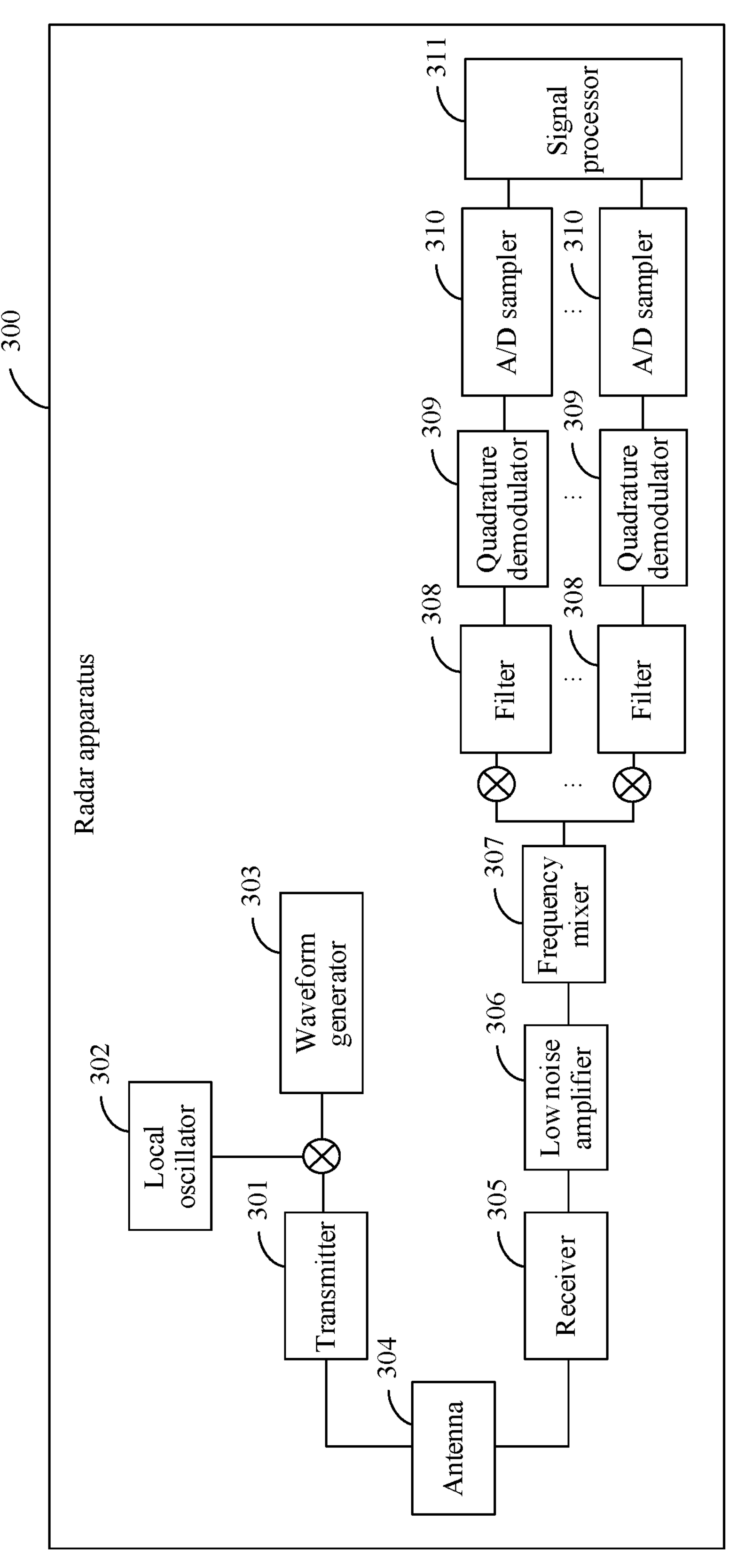
FIG. 3 is a schematic block diagram of another radar apparatus according to an embodiment of this application.

FIG. 3 is a schematic block diagram of another radar apparatus 300 applied to a signal processing method according to an embodiment of this application. The apparatus 300 may be a specific example of the apparatus 100.

As shown in FIG. 3, the apparatus 300 may include a transmitter 301, a local oscillator 302, a waveform generator 303, an antenna 304, a receiver 305, a low noise amplifier 306, a frequency mixer 307, a filter 308, a quadrature demodulator 309, an A/D sampler 310, and a signal processor 311. The transmitter 301, the local oscillator 302, and the waveform generator 303 may be included in the transmitter, as a specific example of the transmitting apparatus 110 in FIG. 1. The receiver 305, the low noise amplifier 306, the frequency mixer 307, the filter 308, the quadrature demodulator 309, the A/D sampler 310, and the like may be included in the receiving apparatus, as a specific example of the receiving apparatus 120 in FIG. 1. The signal processor 311 is a specific example of the signal processor 130 in FIG. 1.

The waveform generator 303 may be configured to generate a chirp waveform transmitted by a radar, for example, may generate an ultra-wideband signal. The local oscillator 302 is configured to provide a local oscillator signal with a fixed oscillation frequency. For example, the chirp waveform may be up-converted to a corresponding transmit frequency by using the local oscillator signal. The transmitter 301 is configured to transmit, through the antenna 304, a radar wave signal obtained through up-conversion.

The receiver 305 is configured to receive an echo signal of the radar wave signal through the antenna 304. The low noise amplifier 306, also referred to as a low noise amplifier, is configured to amplify a high frequency echo signal or an intermediate frequency echo signal received by the receiver 305. The frequency mixer 307 is configured to mix a high-frequency echo signal received by the receiver 305 and a local oscillator frequency into an intermediate frequency. The filter 308 is configured to filter and segment the echo signal of the radar wave signal to obtain subbands. The quadrature demodulator 309 converts an intermediate frequency output signal into a quadrature baseband signal, namely, I and Q components, to obtain an amplitude and a phase in the echo signal. The A/D sampler 310 is configured to directly convert an analog signal into a digital signal. The signal processor 311 is configured to process the digital signal obtained by the A/D sampler 311.

In a possible implementation, as shown in FIG. 3, there may be N filters 308, and each filter is configured to gate echo signals of different frequency bands. N is a positive integer greater than 1. Correspondingly, a quantity of quadrature demodulators 309 and A/D samplers is the same as that of filters 308. The quadrature demodulator 309 and the A/D sampler are respectively configured to perform quadrature demodulation and A/D sampling on a subband obtained by one filter.

In the radar apparatus shown in FIG. 1 or FIG. 3, after obtaining echo signals of a plurality of subbands, a signal processing unit needs to perform subband splicing on the echo signals of the plurality of subbands and synthesize the echo signals into an ultra-wideband echo signal, to obtain a radar imaging result with a high range resolution. The following describes a subband splicing process with reference to FIG. 4 to FIG. 11.

Figure 4:
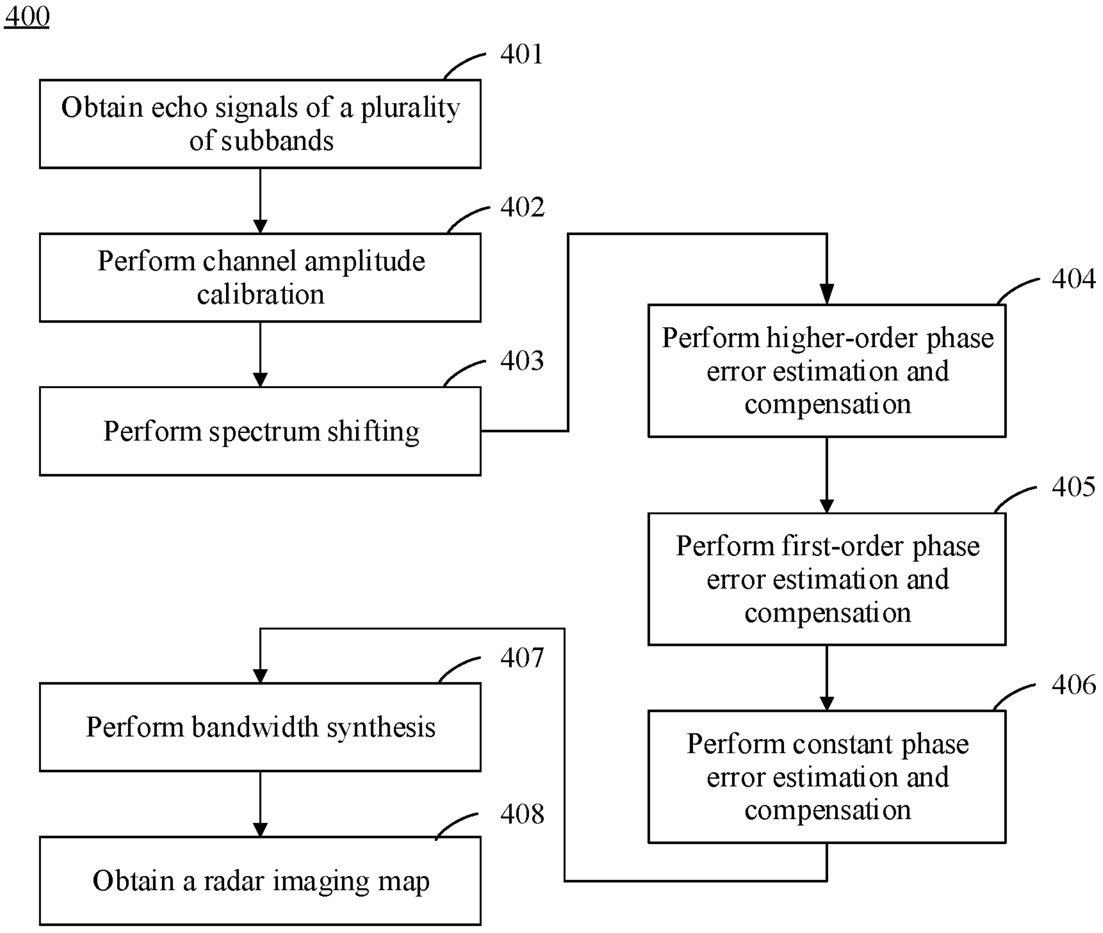
FIG. 4 is a schematic flowchart of a radar imaging map obtaining method according to an embodiment of this application.

FIG. 4 is a schematic flowchart of a radar imaging map obtaining method 400. For example, the method 400 may be performed by a radar apparatus, for example, the radar apparatus 100 in FIG. 1 or the radar apparatus 300 in FIG. 3. Further, the method 400 may be performed by a signal processing unit in the radar apparatus. Alternatively, in some other embodiments, the method 400 may be performed by a processing unit disposed outside the radar apparatus, for example, an in-vehicle computing system, or a cloud server. This is not limited in this application.

It should be understood that FIG. 4 shows steps or operations of the radar imaging map obtaining method, but these steps or operations are merely examples. In embodiments of this application, other operations or variations of the operations in FIG. 4 may be further performed. In addition, the steps in FIG. 4 may be performed in a sequence different from that shown in FIG. 4, and possibly, not all the operations in FIG. 4 need to be performed. As shown in FIG. 4, the method 400 includes step 401 to step 408.

401: Obtain echo signals of a plurality of subbands.

For example, the signal processing unit may obtain the echo signals of the plurality of subbands from a plurality of A/D samplers.

Figure 5:
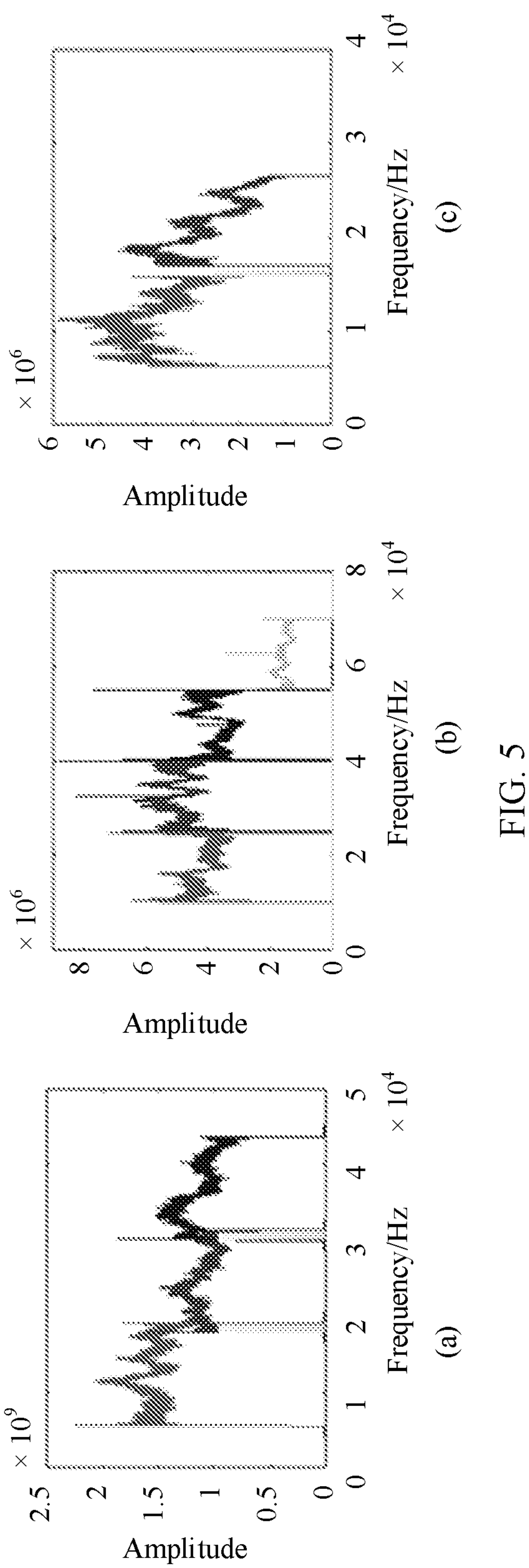
FIG. 5 shows three schematic diagrams of bandwidth distribution of echo signals of a plurality of subbands.

FIG. 5 shows three schematic diagrams of bandwidth distribution of echo signals of a plurality of subbands that may be obtained according to an embodiment of this application. In (a), the signals of the plurality of subbands are in a subband overlapping frequency band mode. In (b), the signals of the plurality of subbands are in a subband adjacent mode. In (c), the signals of the plurality of subbands are in a subband spacing mode. It can be learned from FIG. 5 that, in (a), there are overlapping frequency bands between the signals of the plurality of subbands. In (b) and (c), there are no overlapping frequency bands between the signals of the plurality of subbands.

402: Perform channel amplitude calibration. Specifically, channel amplitude calibration may be performed on the echo signal of each of the plurality of subbands.

In some embodiments, an intra-subband amplitude-phase characteristic of an echo signal of a subband is not ideal because of a radio frequency transmission conversion error of an echo signal of a radar wave signal in radar hardware (for example, a receiver, a low noise amplifier, and a filter). In this case, channel amplitude calibration may be performed on the echo signal of the subband, to compensate an envelope level of echo signal of the subband.

For example, a range spectrum distribution curve function may be obtained by performing superposition, statistics, and higher-order smooth fitting processing on a range frequency domain signal along an azimuth. Then, a reciprocal operation may be performed on the spectrum distribution curve function, to obtain a spectrum amplitude error compensation function. The compensation function is used to compensate a spectrum amplitude of the echo signal of the subband, to implement intra-channel amplitude calibration and obtain an ideal radar response function. The ideal response function may be, for example, a gate function.

Figure 6:
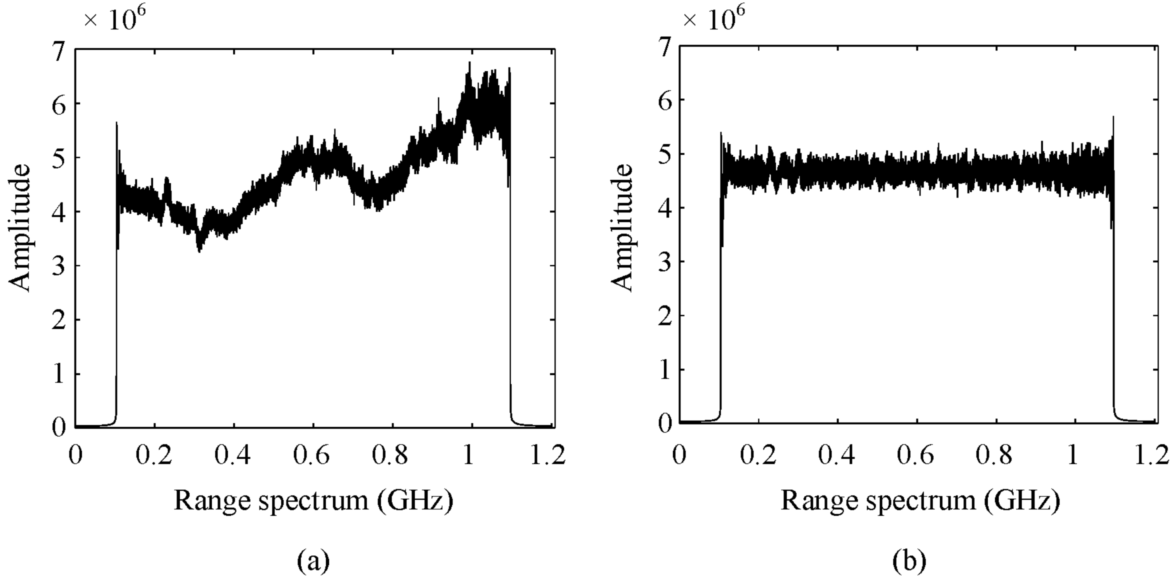
FIG. 6 shows comparison diagrams of inter-subband amplitude-phase characteristics before and after channel amplitude calibration.

(a) in FIG. 6 shows an example of an intra-subband amplitude-phase characteristic before channel amplitude calibration. A spectrum amplitude of the subband is not flat and severely fluctuated. (b) in FIG. 6 shows an example of an intra-subband amplitude-phase characteristic after channel amplitude calibration. It can be learned that an intra-subband spectrum amplitude becomes flat after correction. Therefore, channel amplitude calibration is performed on the echo signal of the subband, so that an intra-subband spectrum amplitude error can be compensated, to obtain an ideal intra-subband amplitude-phase characteristic. This helps improve a subsequent subband splicing effect. On the contrary, if the intra-subband spectrum amplitude error is not compensated, a subsequent subband splicing result is affected.

It should be noted that, after channel amplitude calibration is performed on the echo signals of the plurality of subbands, amplitudes of the echo signal of each subband are the same. In some possible implementations, after channel amplitude calibration is performed on the echo signal of each subband, normalization processing may be performed on amplitudes of the echo signals of the plurality of subbands, so that the amplitudes of the echo signal of each subband are the same.

403: Perform spectrum shifting. Specifically, the echo signals of the plurality of subbands may be rearranged based on a carrier frequency sequence.

For example, multiple up-sampling may be performed on the echo signal of each subband. In a possible implementation, when echo signals of N subbands are obtained, N times upsampling may be performed. N is a positive integer greater than 1. Usually, during up-sampling of a subband signal, the subband signal may be converted to a range frequency domain, and a zero padding operation is performed at both ends of the frequency domain (a zero padding length may be equal to a quantity of range points multiplied by (N−1)), and is multiplied by a conventional transfer function, so that the signals of the plurality of subbands are rearranged based on the carrier frequency sequence, to prepare for subsequent error estimation and subband splicing.

Figure 7:
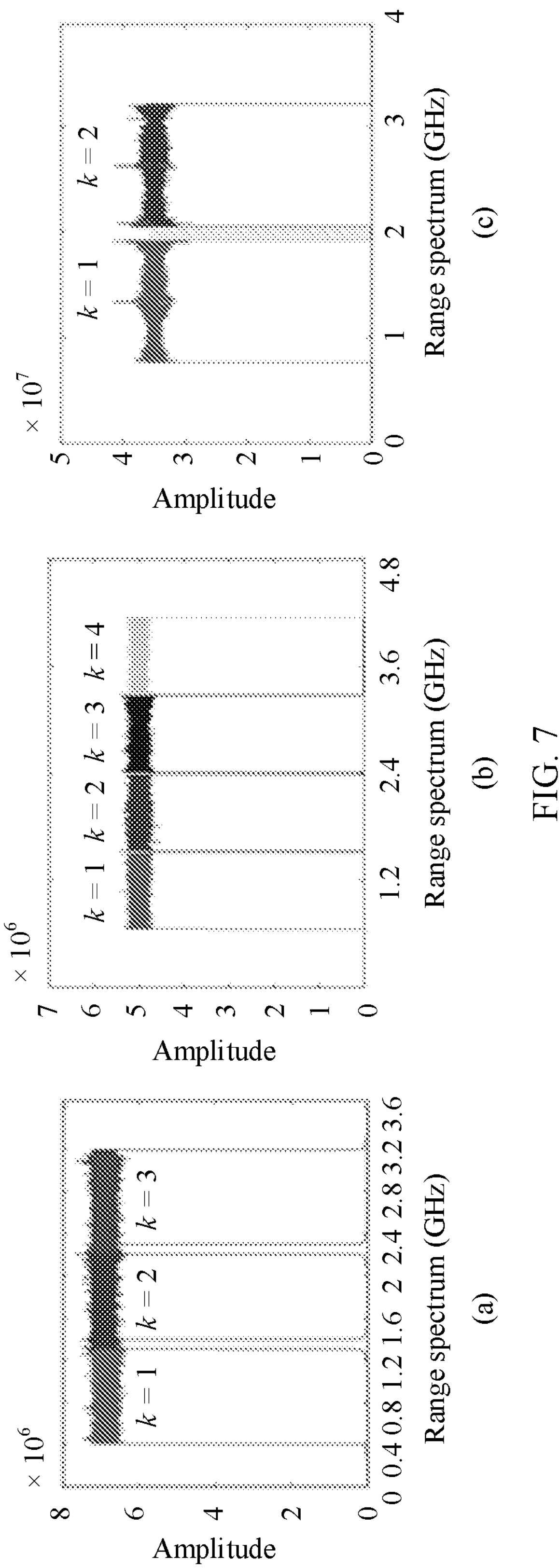
FIG. 7 shows three schematic diagrams of arranging echo signals of a plurality of subbands based on a carrier frequency sequence.

FIG. 7 shows three schematic diagrams of arranging echo signals of a plurality of subbands based on a carrier frequency sequence. (a) shows echo signals of a plurality of subbands in a subband overlapping mode. Carrier frequencies corresponding to subbands k=1, k=2, and k=3 increase sequentially. There is an overlapping frequency band between the subband k=1 and the subband k=2, and there is an overlapping frequency between the subband k=2 and the subband k=3. (b) shows echo signals of a plurality of subbands in a subband adjacent mode. Carrier frequencies corresponding to subbands k=1, k=2, k=3, and k=4 increase sequentially. The subband k=1 is adjacent to the subband k=2, the subband k=2 is adjacent to the subband k=3, and the subband k=3 is adjacent to the subband k=4. That is, there is no overlapping frequency band between the four subbands. (c) shows echo signals of a plurality of subbands in a subband spacing mode. Carrier frequencies corresponding to subbands k=1 and k=2 increase sequentially. There is a frequency band spacing between the subband k=1 and the subband k=2.

In some embodiments, after envelope level compensation (that is, step 402) and spectrum shifting (that is, step 403) are performed on the echo signal of the subband, a phase level error (namely, a phase error) of the echo signal of the subband needs to be estimated and compensated. The phase error may include an intra-subband higher-order phase error and an inter-subband lower-order phase error. The inter-subband lower-order phase error includes a first-order phase error (also referred to as a first-order linear phase error) and a zero-order phase error (usually referred to as a constant phase error). The following steps 404 to 406 separately describe a process of estimating and compensating the higher-order phase error, the first-order phase error, and the constant phase error of the echo signal of the subband.

404: Perform higher-order phase error estimation and compensation. Specifically, a higher-order phase error of the echo signal of each subband may be estimated and compensated.

In a possible implementation, the higher-order phase error may be estimated according to a range energy contrast-enhanced phase optimization algorithm. For example, an image energy contrast may be used as a measurement criterion for image focusing, and an estimated value of the phase error may be continuously adjusted to perform an optimization operation. Correspondingly, a range higher-order phase error corresponding to a maximum image contrast function is the obtained higher-order phase error. The optimization process is an optimization problem with the higher-order phase error as an independent variable and an image contrast as a cost function. In a specific example, the contrast may be defined as a ratio of an amplitude variance of each azimuth unit data to a square of mean value of a SAR image. A range pulse compression result of an echo signal of a single subband can be well focused (for example, it may be manifested as symmetrical low side lobes distributed at the left and right of a main peak) through a contrast optimization operation.

In another possible implementation, the higher-order phase error may be estimated based on an internal calibration signal of the radar apparatus. In the radar apparatus, a calibration loop may be configured for a radar transmit device. The radar apparatus transmits an internal loop signal and receives, by using a radar receiver, an internal calibration signal corresponding to the internal loop signal. After passing through a radar transmit/receive link, the internal calibration signal has the same transmit/receive link characteristic as a measured echo signal. Therefore, the higher-order phase error may be extracted based on the received internal calibration signal, and the higher-order phase error in the echo signal of the subband may be compensated.

405: Perform first-order phase error estimation and compensation. Specifically, first-order phase errors between adjacent subbands in the echo signals of the plurality of subbands may be separately estimated and compensated.

In a possible implementation, because of a first-order linear phase error, envelopes of a same target in echo signals of different subbands after pulse compression are not at a same range. Consequently, coherent synthesis cannot be performed. Therefore, the first-order linear phase error may be obtained by calculating an offset of envelopes of echo signals of two adjacent subbands. For example, an energy correlation method may be used to estimate offsets of envelopes of a same target in echo signals of different subbands, and then the offsets are converted into a form of a first-order linear phase to compensate echo signal of a subband. For example, the offset may be compensated by using an envelope shift function, so that the first-order phase error in the lower-order phase error of the echo signal of the subband can be compensated.

In some possible designs, a plurality of strongly scattered points may be selected, offsets may be estimated separately by using the energy correlation method, and a plurality of offsets obtained through estimation are averaged, to obtain an average offset value. Herein, the average offset value may include an integer part and a decimal part. First-order phase errors between subbands are compensated, so that a same scattering point is distributed in a same range unit of adjacent subbands.

406: Perform constant phase error estimation and compensation. Specifically, constant phase errors between adjacent subbands in the echo signals of the plurality of subbands may be separately estimated and compensated.

Because there is a constant phase error between adjacent subbands, a main lobe of a synthetic bandwidth signal obtained by splicing is split, and side lobes are increased, which directly affects quality of subband splicing. In the most severe case, when the constant phase error is large enough, the main lobe of the synthetic bandwidth signal may be split into two main lobes, so that the target has a main lobe and a split pseudo-main lobe, which seriously affects radar imaging quality.

Therefore, it can be learned that, when adjacent subbands with a constant phase error are synthesized and superposed to obtain a spliced synthetic bandwidth signal, a related peak point (for example, peak points corresponding to main lobe or left and right side lobes) in the spliced synthetic bandwidth signal is related to a constant phase error between adjacent subbands before splicing. Based on this, the constant phase error between the adjacent subbands may be estimated based on related information of the main lobe or the left and right side lobes in the spliced synthetic bandwidth signal.

To estimate the constant phase error between the adjacent subbands, two operation models are proposed in this embodiment of this application: a splitting main lobe inverse-operation model and a left-right side lobe equalization model. The following describes a process of performing constant phase estimation by using the two models.

(1) Inter-Subband Constant Phase Estimation Based on the Splitting Main Lobe Inverse-Operation Model The splitting main lobe inverse-operation model is configured to represent a mapping relationship between a constant phase error of adjacent subbands and a difference between a peak point of a main lobe (namely, a main peak) in a synthetic bandwidth signal and a peak point of a first side lobe adjacent to the main peak (this difference can also be referred to as a ratio to a peak point to a side lobe). Herein, a peak point corresponding to the first side lobe is higher than a peak point of another second side lobe adjacent to the main peak, that is, the first side lobe is a second strong peak. The first side lobe may be a left side lobe, or may be a right side lobe. This is not limited.

In a solution of estimating a constant phase between subbands by using the splitting main lobe inverse-operation model, a difference between a peak point of a main lobe and a peak point of an adjacent side lobe (namely, the second strong peak) in a synthetic bandwidth signal that is of a target and that is obtained through synthesis and superimposition is substituted into the splitting main lobe inverse-operation model, so that a phase error between subbands may be obtained by using a mapping relationship between the difference between the peak point of the main lobe and the peak point of the adjacent side lobe and the constant phase error between subbands.

The following describes a process of obtaining the constant phase error by using the splitting main lobe inverse-operation model.

For example, a first range time-domain signal of a first subband may be represented by the following formula (1):

$$R_i(t_q) = \mathrm{sinc}(\gamma T t_q)e^{-j\pi\gamma T t_q} \tag{1}$$

A second range time-domain signal of a second subband may be represented by the following formula (2):

$$R_{i+1}(t_q) = \mathrm{sinc}(\gamma T t_q)e^{j\pi\gamma T t_q}e^{j\theta_{err}} \tag{2}$$

$R_i(t_q)$ represents a range time-domain signal of an $i^{th}$ subband at a range moment $t_q$, $i\in[1, I]$, I represents a quantity of subbands on which bandwidth synthesis needs to be performed, $q\in[1, Q]$ represents a range discrete sampling moment, Q represents a total range discrete sampling moment, $\sin c(\gamma T t_q)$ represents a signal range envelope signal, $\gamma$ represents a range chirp slope, T represents a radar transmission time period, $e^{j\pi\gamma T t_q}$ represents signal range phase information, $e^{j\theta_{err}}$ represents inter-subband signal range phase error information, and $\theta_{err}$ represents an inter-subband signal range phase error, $\theta_{err}\in[0,2\pi]$ It should be noted that an example in which the first range time-domain signal is formula (1) and the second range time-domain signal is formula (2) is used for description herein. However, this embodiment of this application is not limited thereto. For example, the first range time-domain signal may alternatively be an equivalent transformation of formula (1) or another form different from formula (1), and the second range time-domain signal may alternatively be an equivalent transformation of formula (2) or another form different from formula (2). The equivalent transformation or another form shall fall within the protection scope of this embodiment of this application.

Bandwidth synthesis and superposition (for example, coherent synthesis) are directly performed on the first range time-domain signal and the second range time-domain signal that include the constant phase error, that is, formula (1) and formula (2), to obtain a preliminary synthesis result, as shown in the following formula (3):

$$R_d(t_q;\theta) = \mathrm{sinc}(\gamma T t_q)\cos(\pi\gamma T t_q)\left[\left(1+e^{j(\theta-\theta_{err})}\right) - j\cdot\left(1-e^{j(\theta-\theta_{err})}\right)\cdot\tan(\pi\gamma T t_q)\right] \tag{3}$$

$R_d(t_q;\theta)$ represents a synthetic bandwidth signal including a phase error, and $\theta$ represents a compensation value $\theta\in[0, 2\pi]$ for a constant phase error $\theta_{err}$. Therefore, in formula (3), $\theta$ is an independent variable. A synthetic bandwidth signal $R_d(t_q;\theta)$ of the first subband and the second subband differs with different values of $\theta$. In other words, each synthetic bandwidth signal corresponds to a specific value of $\theta$.

Further, formula (3) may be deduced to obtain the following formula (4):

$$R_d(t_q;\theta) = \left(1+e^{j(\theta-\theta_{err})}\right)\cdot r_1(t_q) - j\cdot\left(1-e^{j(\theta-\theta_{err})}\right)\cdot r_2(t_q) \tag{4}$$

In the formula:

$$r_1(t_q) = \mathrm{sinc}(2\gamma T t_q)$$

$$r_2(t_q) = \mathrm{sinc}(\gamma T t_q)\sin(\pi\gamma T t_q)$$

It may be understood that formula (3) and formula (4) each represent a synthetic bandwidth signal that may also be referred to as the third range time-domain signal.

Figure 8:
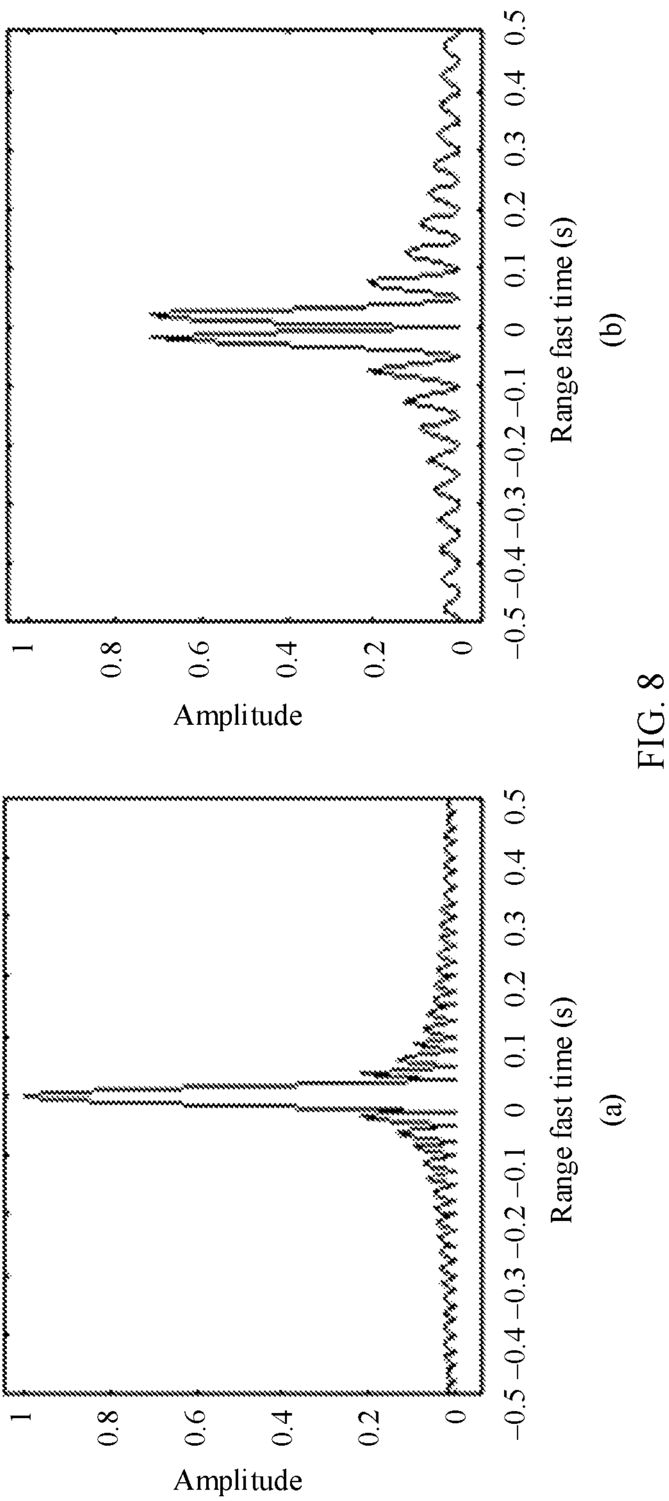
FIG. 8 shows schematic diagrams of a range pulse response function $r_1(t_q)$ and a range pulse response function $r_2(t_q)$ according to an embodiment of this application.

In formula (4), $r_1(t_q)$ is a first group of range pulse response functions in the synthetic bandwidth signal, and $r_2(t_q)$ is a second group of range pulse response functions in the synthetic bandwidth signal. In FIG. 8, (a) is a schematic diagram of a range pulse function response of $r_1(t_q)$, and (b) is a schematic diagram of a range pulse response function of $r_2(t_q)$.

As shown in (a) in FIG. 8, a bandwidth of a simulation function of $r_1(t_q)$ is twice as much as a bandwidth $\gamma T$ of an original signal $R_j(t_q)$ of a single subband, that is, $2\gamma T$. $r_1(t_q)$ is an ideal bandwidth synthesis result. This term is a term that needs to be reserved, and its coefficient needs to be maximized. That is, when $(1+e^{j(\theta-\theta_{err})})$ is equal to 2, the independent variable $\theta$ is equal to an actual constant phase error $\theta_{err}$.

As shown in (b) in FIG. 8, $r_2(t_q)$ is a subband signal modulated by a $\sin(\cdot)$ function, and a notch is formed at a zero point location. The notch may be understood as that splitting of the bandwidth synthesis signal causes target signals to be scattered. This reduces a signal-to-noise ratio of an image. The term $r_2(t_q)$ affects a bandwidth synthesis result and needs to be suppressed. A coefficient $(1-e^{j(\theta-\theta_{err})})$ needs to be suppressed to zero. In this case, the independent variable $\theta$ is equal to the actual constant phase error $\theta_{err}$. To sum up, when the independent variable $\theta$ is close to or equal to the actual constant phase error $\theta_{err}$, a component $r_1(t_q)$ that maximizes a desired coefficient can be obtained, and an undesired component $r_2(t_q)$ can be suppressed.

In formula (4), different $R_d(t_q;\theta)$ results corresponding to different $(\theta-\theta_{err})$ are obtained due to different values of $\theta$. Therefore, formula (4) may be reorganized to obtain the following formula (5):

$$R_d(t_q;\Delta\theta) = \left(1+e^{j\Delta\theta}\right)\cdot r_1(t_q) - j\cdot\left(1-e^{j\Delta\theta}\right)\cdot r_2(t_q) \tag{5}$$

$R_d(t_q;\Delta\theta)$ also represents a synthetic bandwidth signal that may also be referred to as the third range time-domain signal. $\Delta\theta=\theta-\theta_{err}$ represents a residual constant phase error $\Delta\theta\in[0,2\pi]$ after compensation is performed on $\theta_{err}$.

As $\Delta\theta$ gradually increases from 0, $(1+e^{j\Delta\theta})$ gradually decreases and $(1-e^{j\Delta\theta})$ gradually increases. As $\Delta\theta$ gradually increases from $\pi$ to $2\pi$, $(1+e^{j\Delta\theta})$ gradually increases and $(1-e^{j\Delta\theta})$ gradually decreases.

Figure 9:
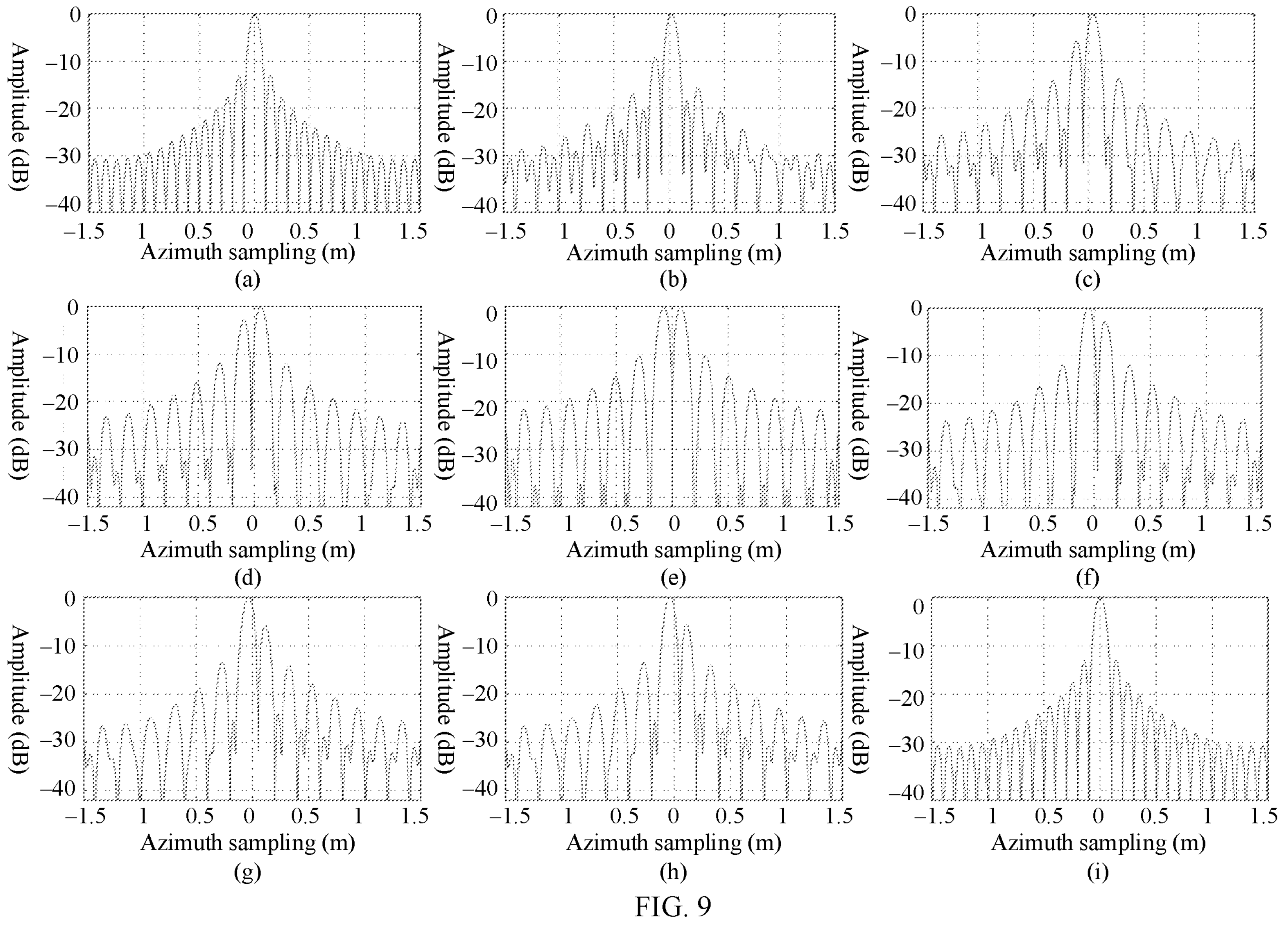
FIG. 9 shows a synthetic bandwidth pulse compression according to an embodiment of this application.

With reference to a simulation result of a synthetic bandwidth signal in FIG. 9, the following describes an example of a change of $R_d(t_q;\Delta\theta)$ in a process in which $\Delta\theta$ gradually increases from 0 to $2\pi$. Synthetic bandwidth pulse compression results in (a) to (i) in FIG. 9 are synthetic bandwidth signals, namely, the third range time-domain signals.

(a) in FIG. 9 describes a synthetic bandwidth pulse compression result when $\Delta\theta=0$. An amplitude of the coefficient $(1+e^{j\Delta\theta})$ of $r_1(t_q)$ in $R_d(t_q;\Delta\theta)$ is 2. An action ratio of $r_1(t_q)$ is the largest. An amplitude of the coefficient $(1-e^{j\Delta\theta})$ of $r_2(t_q)$ is 0. An action ratio of $r_2(t_q)$ is the smallest. In this case, a main lobe of a synthesized range time-domain signal is the largest. As shown in FIG. 9(*a*), in this case, a peak location of the main lobe is 0 m, and a difference between a peak point of the main lobe and a peak point of an adjacent side lobe is 13.26 dB. In other words, when $\Delta\theta=0$, the constant phase error $\theta_{err}$ is compensated, and range time-domain signals of adjacent subbands are perfectly synthesized and superimposed.

(b) in FIG. 9 describes a synthetic bandwidth pulse compression result when $\Delta\theta=\pi/4$. When $\Delta\theta$ increases from 0 to $\pi/4$, an amplitude of $(1+e^{j\Delta\theta})$ decreases from 2 to 1.85, and an action ratio of $r_1(t_q)$ gradually decreases. An amplitude of $(1-e^{j\Delta\theta})$ increases from 0 to 0.77, and an action ratio of $r_2(t_q)$ gradually increases. During this process, in the synthetic bandwidth pulse compression result, a left side lobe gradually increases, and energy of a main lobe gradually decreases. As shown in FIG. 9(*b*), in this case, a location of a main peak is 0.0183, and a difference between a peak point of the main lobe and a peak point of a left side lobe adjacent to the main lobe is −9.144 dB.

(c) in FIG. 9 describes a synthetic bandwidth pulse compression result when $\Delta\theta=\pi/2$. When $\Delta\theta$ increases from $\pi/4$ to $\pi/2$, an amplitude of $(1+e^{j\Delta\theta})$ decreases from 1.85 to 1.41, and an action ratio of $r_1(t_q)$ gradually decreases. An amplitude of $(1-e^{j\Delta\theta})$ increases from 0.77 to 1.41, and an action ratio of $r_2(t_q)$ gradually increases. During this process, in the synthetic bandwidth pulse compression result, a left side lobe further increases, and energy of a main lobe further decreases. As shown in FIG. 9(*c*), in this case, a location of a main peak is 0.0367, and a difference between a peak point of the main lobe and a peak point of a left side lobe adjacent to the main lobe is 5.781 dB.

(d) in FIG. 9 describes a synthetic bandwidth pulse compression result when $\Delta\theta=3\pi/4$. When $\Delta\theta$ increases from $\pi/2$ to $3\pi/4$, an amplitude of $(1+e^{j\Delta\theta})$ decreases from 1.41 to 0.77, and an action ratio of $r_1(t_q)$ gradually decreases. An amplitude of $(1-e^{j\Delta\theta})$ increases from 1.41 to 1.85, and an action ratio of $r_2(t_q)$ gradually increases. During this process, in the synthetic bandwidth pulse compression result, a left side lobe further increases, and energy of a main lobe further decreases. As shown in FIG. 9(*d*), a location of a main peak is 0.0567, and a difference between a peak point of the main lobe and a peak point of a left side lobe adjacent to the main lobe is 2.795 dB.

(e) in FIG. 9 describes a synthetic bandwidth pulse compression result when $\Delta\theta=\pi$. When $\Delta\theta$ increases from $3\pi/4$ to $\pi$, an amplitude of $(1+e^{j\Delta\theta})$ decreases from 0.77 to 0, and an action ratio of $r_1(t_q)$ is 0. An amplitude of $(1-e^{j\Delta\theta})$ increases from 1.85 to 2, and an action ratio of $r_2(t_q)$ is the largest. During this process, in the synthetic bandwidth pulse compression result, a left side lobe increases to a maximum value that is equal to an amplitude value of an original main lobe. In this case, it may be considered that the original main lobe is split into two strong pseudo peaks. As shown in FIG. 9(*e*), in this case, locations of a main peak (namely, locations of two strong pseudo peaks) are ±0.075, and a difference (namely, a difference between two strong pseudo peaks) between a peak point of the main lobe and a peak point of a side lobe adjacent to the main lobe is 0.

(f) in FIG. 9 describes a synthetic bandwidth pulse compression result when $\Delta\theta=5\pi/4$. When $\Delta\theta$ increases from it to $5\pi/4$, an amplitude of $(1+e^{j\Delta\theta})$ increases from 0 to 0.77, and an action ratio of $r_1(t_q)$ gradually increases. An amplitude of $(1-e^{j\Delta\theta})$ decreases from 2 to 1.85, and an action ratio of $r_2(t_q)$ gradually decreases. During this process, in the synthetic bandwidth pulse compression result, a left side lobe has become a main lobe, an amplitude of the left side lobe gradually increases, and energy of a right side lobe gradually decreases. As shown in FIG. 9(*f*), in this case, a location of a main peak is −0.0567, and a difference between a peak point of the main lobe and a peak point of a right side lobe adjacent to the main lobe is −2.795 dB.

(g) in FIG. 9 describes a synthetic bandwidth pulse compression result when $\Delta\theta=3\pi/2$. When $\Delta\theta$ increases from $5\pi/4$ to $3\pi/2$, an amplitude of $(1+e^{j\Delta\theta})$ increases from 0.77 to 1.41, and an action ratio of $r_1(t_q)$ gradually increases. An amplitude of $(1-e^{j\Delta\theta})$ decreases from 1.85 to 1.41, and an action ratio of $r_2(t_q)$ decreases gradually. During this process, in the synthetic bandwidth pulse compression result, an amplitude of a main lobe gradually increases and energy of a right side lobe gradually decreases. As shown in FIG. 9(*g*), in this case, a location of a main peak is −0.0367, and a difference between a peak point of the main lobe and a peak point of a right side lobe adjacent to the main lobe is −5.781 dB.

(h) in FIG. 9 describes a synthetic bandwidth pulse compression result when $\Delta\theta=7\pi/4$. When an amplitude of $\Delta\theta$ increases from $3\pi/2$ to $7\pi/4$, an amplitude of $(1+e^{j\Delta\theta})$ increases from 1.41 to 1.85, and an action ratio of $r_1(t_q)$ gradually increases. An amplitude of $(1-e^{j\Delta\theta})$ decreases from 1.41 to 0.77, and an action ratio of $r_2(t_q)$ gradually decreases. During this process, in the synthetic bandwidth pulse compression result, an amplitude of a main lobe further increases, and energy of a right side lobe gradually decreases. As shown in FIG. 9(*h*), in this case, a location of a main peak is −0.0183, and a difference between a peak point of the main lobe and a peak point of a right side lobe adjacent to the main lobe is −9.144 dB.

(i) in FIG. 9 describes a synthetic bandwidth pulse compression result when $\Delta\theta=2\pi$. When $\Delta\theta$ increases from $7\pi/4$ to $2\pi$, an amplitude of $(1+e^{j\Delta\theta})$ increases from 1.85 to 2, and an action ratio of $r_1(t_q)$ is the largest. An amplitude of $(1-e^{j\Delta\theta})$ decreases from 0.77 to 0, and an action ratio of $r_2(t_q)$ is zero. During this process, in the synthetic bandwidth pulse compression result, an amplitude of the main lobe further increases to a maximum value and energy of a right side lobe gradually decreases to a minimum value. In this case, a peak location of the main lobe and a difference between a peak point of the main lobe and a peak point of a side lobe adjacent to the main lobe are the same as a response value in FIG. 9(*a*).

Based on the simulation result in FIG. 9, a mapping relationship between a residual constant phase error $\Delta\theta$ and performance of a synthetic bandwidth pulse compression result may be obtained, as shown in Table 1.

TABLE 1

| Δθ(rad) | Peak location of a main lobe (m) | Difference between a main lobe and a first side lobe (dB) |
|---|---|---|
| 0 | 0 | −13.26 |
| 0.25π | 0.0183 | −9.144 |
| 0.5π | 0.0367 | −5.781 |
| 0.75π | 0.0567 | −2.795 |
| π | ±0.075 | 0 |
| 1.25π | −0.0567 | −2.795 |
| 1.5π | −0.0367 | −5.781 |
| 1.75π | −0.0183 | −9.144 |
| 2π | 0 | −13.26 |

Figure 10:
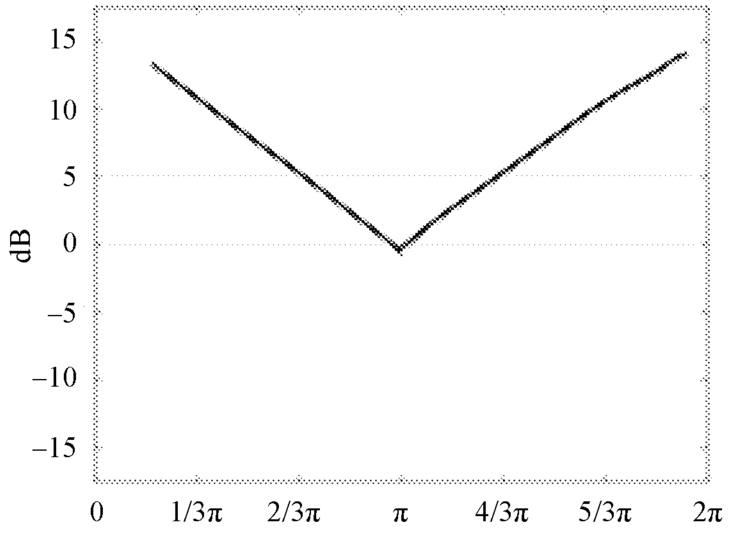
FIG. 10 is a mapping diagram of a residual constant phase error Δθ and a difference between a main lobe and a first side lobe of a synthetic bandwidth pulse compression result.

Further, a mapping diagram of the residual constant phase error $\Delta\theta$ and a difference between the main lobe and the first side lobe in the synthetic bandwidth pulse compression result may be obtained based on the simulation result in FIG. 9. FIG. 10 shows an example of the mapping map. Refer to FIG. 10. When the residual constant phase error $\Delta\theta$ is it, the difference between the main lobe and the first side lobe is the smallest, that is, 0. When the residual constant phase error $\Delta\theta$ increases from 0 to π, the difference between the main lobe and the first side lobe decreases linearly until it is 0. In this case, the peak point corresponding to the first side lobe is on the left side of the peak point corresponding to the main lobe, that is, the first side lobe is a left adjacent side lobe of the main peak. As the residual constant phase error $\Delta\theta$ increases from π to 2π, the difference between the main lobe and the first side lobe increases linearly. In this case, the peak point corresponding to the first side lobe is on the right side of the peak point corresponding to the main lobe, that is, the first side lobe is a right adjacent side lobe of the main peak.

It should be noted that, according to the theoretical derivation process, the splitting main lobe inverse-operation model may include a mapping relationship between the difference between the main lobe and the first side lobe in the synthetic bandwidth signal and the residual constant phase error $\Delta\theta$. In addition, the splitting main lobe inverse-operation model may further include a mapping relationship between the residual constant phase error $\Delta\theta$ and the constant phase error $\theta_{err}$, that is, $\Delta\theta=\theta-\theta_{err}$. Therefore, after the difference between the main lobe and the first side lobe in the synthetic bandwidth signal is substituted into the splitting main lobe inverse-operation model, the constant phase error $\theta_{err}$ between subbands may be obtained based on the mapping relationship between the difference between the main lobe and the first side lobe in the synthetic bandwidth signal and the residual constant phase error $\Delta\theta$ and the mapping relationship between the residual constant phase error $\Delta\theta$ and the constant phase error $\theta_{err}$.

In a possible implementation, based on the mapping relationship in FIG. 10, for a synthetic bandwidth pulse compression result corresponding to a given θ value, an amplitude value of a strongest peak in the synthetic bandwidth pulse compression result, a location of the strongest peak, and an amplitude value of a second strongest peak may be obtained through measurement. Then, a value of the residual constant phase error $\Delta\theta$ may be determined based on the mapping relationship in FIG. 10 and a difference between the amplitude value of the strongest peak and the amplitude value of the second strong peak. Then, the residual constant phase error $\Delta\theta$ and the compensation value θ are substituted into $\Delta\theta=\theta-\theta_{err}$, to obtain a value of $\theta_{err}$.

Therefore, in this embodiment of this application, after the difference between the main lobe and the first side lobe in the synthetic bandwidth signal is obtained, the constant phase error $\theta_{err}$ between subbands may be obtained by using the splitting main lobe inverse-operation model, that is, based on the mapping relationship between the difference between the main lobe and the first side lobe in the synthetic bandwidth signal and the residual constant phase error $\Delta\theta$ and the mapping relationship between the residual constant phase error $\Delta\theta$ and the constant phase error $\theta_{err}$.

In another possible implementation, based on the mapping diagram in FIG. 10, a target function T ($\Delta\theta$) may be constructed, as shown in the following formula (6):

$$T(\Delta\theta)=\min[F_1(\Delta\theta)-F_2(\Delta\theta)] \tag{6}$$

$F_1(\Delta\theta)$ represents a peak value of a main lobe in a synthetic bandwidth pulse compression result, and $F_2(\Delta\theta)$ represents a peak value of a first side lobe in the synthetic bandwidth pulse compression result. That is, $F_1(\Delta\theta)$ corresponds to an amplitude value of a strongest peak in the synthetic bandwidth pulse compression result, and $F_2(\Delta\theta)$ corresponds to an amplitude value of a second strongest peak in the synthetic bandwidth pulse compression result.

In formula (6), when a minimum value (that is, close to 0) of $\min[F_1(\Delta\theta)-F_2(\Delta\theta)]$ is taken, the main lobe in the synthetic bandwidth pulse compression result is split into two lobes with basically the same peak strength. In this case, $\Delta\theta=\pi$. $\Delta\theta=\pi$ is substituted into $\Delta\theta=\theta-\theta_{err}$ to obtain the constant phase error $\theta_{err}$ between subbands, that is, $\theta_{err}=\theta-\pi$. It can be learned that, when the synthetic bandwidth pulse compression result is determined, the compensation value θ for the constant phase error $\theta_{err}$ in a synthesis and superposition process is also determined, and therefore a value of $\theta_{err}$ may be obtained.

Therefore, in this embodiment of this application, a minimum value of the difference between the main lobe and the first side lobe in the synthetic bandwidth signal is obtained. Based on the splitting main lobe inverse-operation model, when the difference between the main lobe and the first side lobe in the synthetic bandwidth signal is the minimum value, the residual constant phase error $\Delta\theta$ is π. In this case, $\theta_{err}=\theta-\pi$. The constant phase error $\theta_{err}$ between subbands may be obtained by substituting a compensation value θ corresponding to the synthetic bandwidth signal.

(2) Inter-Subband Constant Phase Estimation Based on the Left-Right Side Lobe Equalization Model The left-right side lobe equalization model is configured to represent a mapping relationship between a difference between peak points of left and right side lobes in a synthetic bandwidth signal and a constant phase error between adjacent subbands. It can be learned from the simulation diagram of the synthetic bandwidth signal that, when peaks of left and right side lobes of the synthetic bandwidth signal are equal and balanced, that is, a difference between peak points of the left and right side lobes is 0, it indicates that there is no constant phase error between adjacent subbands of the synthesized signal at this time. That is, the constant phase error of the synthetic bandwidth signal is 0.

In a solution of estimating a constant phase between subbands by using the left-right side lobe equalization model, a difference between peak points of left and right side lobes in a synthetic bandwidth signal that is of a target and that is obtained through synthesis and superimposition is substituted into the left-right side lobe equalization model, so that a constant phase error between subbands may be obtained by using a mapping relationship between the difference between the peak points of the left and right side lobes and the constant phase error between subbands.

The following describes a process of obtaining the constant phase error by using the left-right side lobe equalization model.

Herein, the process of obtaining the constant phase error by using the left-right side lobe equalization model is also described by using a first range time-domain signal of a first subband as formula (1), and a second range time-domain signal of a second subband as formula (2).

Bandwidth synthesis and superposition (for example, coherent synthesis) are directly performed on the first range time-domain signal and the second range time-domain signal that include the constant phase error, that is, formula (1) and formula (2), to obtain a preliminary synthesis result, as shown in the following formula (7):

$$Q(t_q)=R_j(t_q)+R_{j+1}(t_q)=\mathrm{sinc}(\gamma Tt_q)e^{-j\pi\gamma Tt_q}+\mathrm{sinc}(\gamma Tt_q)e^{j\pi\gamma Tt_q}e^{j\theta_{err}} \quad (7)$$

$Q(t_q)$ represents a synthetic bandwidth signal including a phase error. The synthetic bandwidth signal may also be referred to as a third range time-domain signal.

Further, formula (7) is sorted out to obtain the following formula (8):

$$\begin{aligned}Q(t_q)&=\sin c(\gamma Tt_q)\left[e^{-j\pi\gamma Tt_q}+e^{j\pi\gamma Tt_q}e^{j\theta_{err}}\right]\\&=\sin c(2\gamma Tt_q)\left[1-j\tan(\pi\gamma Tt_q)+(1+j\tan(\pi\gamma Tt_q))e^{j\theta_{err}}\right]\end{aligned} \quad (8)$$

Herein, based on a mapping relationship between left adjacent side lobe and right adjacent side lobe (namely, left and right side lobes) of a main lobe of a synthetic bandwidth signal and a constant phase error $\theta_{err}$, a target whose left side lobe and right side lobe of a main lobe are equaled and balanced may be constructed to solve the constant phase error $\theta_{err}$.

Based on function characteristics of sin c, left adjacent side lobes $Q_l(\theta_{err})$ are centered on the main lobe at the left side $t_q=3/(4\gamma T)$, and right adjacent side lobes $Q_r(\theta_{err})$ are centered on the main lobe at the right side $t_q=3/(4\gamma T)$. With reference to formula (8), it may be obtained that $Q_l(\theta_{err})$ meets the following formula (9) and $Q_r(\theta_{err})$ meets the following formula (10):

$$Q_l(\theta_{err})=Q(t_q)|_{t_q=-3/(4\gamma T)}=-\frac{2}{3\pi}\left[(1-j)+(1+j)e^{j\theta_{err}}\right] \quad (9)$$

$$Q_r(\theta_{err})=Q(t_q)|_{t_q=3/(4\gamma T)}=-\frac{2}{3\pi}\left[(1+j)+(1-j)e^{j\theta_{err}}\right] \quad (10)$$

$Q_l(\theta_{err})$ represents a mapping relationship between a left adjacent side lobe of a main lobe and a constant phase error $\theta_{err}$, and $Q_r(\theta_{err})$ represents a mapping relationship between a right adjacent side lobe of the main lobe and the constant phase error $\theta_{err}$.

Formulas (11) and (12) may be obtained by sorting the following formulas (9) and (10):

$$Q_l(\theta_{err})=-\frac{2}{3\pi}(1-j)-\frac{2}{3\pi}(1+j)\exp(j\theta_{err}) \quad (11)$$

$$Q_r(\theta_{err})=-\frac{2}{3\pi}(1+j)-\frac{2}{3\pi}(1-j)\exp(j\theta_{err}) \quad (12)$$

In this case, the left-right side lobe equalization model $P(\theta_{err})$ may be constructed according to formula (11) and formula (12), as shown in the following formula (13):

$$\begin{aligned}P(\theta_{err})&=|Q_r(\theta_{err})|-|Q_l(\theta_{err})|\\&=\frac{4}{3\pi}\left[\sqrt{1+\sin(\theta_{err})}-\sqrt{1-\sin(\theta_{err})}\right]\end{aligned} \quad (13)$$

$P(\theta_{err})$ represents a mapping relationship between a difference between a left adjacent side lobe of a main peak and a right adjacent side lobe of the main peak and a constant phase error $\theta_{err}$. In this case, different values of $\theta_{err}$ are substituted into formula (13), and different results of $P(\theta_{err})$ are obtained.

Further, formula (13) is sorted out to obtain an expression of $\theta_{err}$ about $P(\theta_{err})$, as shown in the following formula (14):

$$\theta_{err}=\frac{P(\theta_{err})}{|P(\theta_{err})|}\cdot\arccos\left(1-\frac{9\pi^2}{32}P^2(\theta_{err})\right) \quad (14)$$

A synthetic bandwidth signal of adjacent subbands is directly measured to obtain $P(\theta_{err})$. $P(\theta_{err})$ is substituted into formula (14) to directly solve $\theta_{err}$, that is, estimation of the constant phase error between adjacent subbands is completed.

Therefore, in this embodiment of this application, after a difference between the left adjacent side lobe and the right adjacent side lobe of the main lobe in the synthetic bandwidth signal is obtained, the constant phase error $\theta_{err}$ between subbands is obtained by using the left-right side lobe equalization model, that is, based on a mapping relationship between the difference between the left adjacent side lobe and the right adjacent side lobe of the main lobe in the synthetic bandwidth signal and the constant phase error $\theta_{err}$ between adjacent subbands.

In some optional embodiments, the signal processing unit may store the splitting main lobe inverse-operation model or the left-right side lobe equalization model. In this way, measured data of the main lobe or the left and right side lobes of the synthetic bandwidth signal may be substituted into a corresponding operation model to solve a corresponding constant phase error $\theta_{err}$ between adjacent subbands. In this embodiment of this application, when the constant phase error between adjacent subbands is obtained, a single solution may be performed without iteration. This may help save computing resources and reduce system complexity.

After the constant phase error $\theta_{err}$ between subbands is obtained, a constant phase error compensation function $P_{comp}(\theta_{err})$ may be determined based on the constant phase error $\theta_{err}$, as shown in the following formula (15):

$$P_{comp}(\theta_{err})=\exp(j\theta_{err}) \quad (15)$$

Then, constant phase error compensation may be performed on adjacent subbands according to formula (15). For example, compensation may be performed on a range time-domain signal of the second subband. After constant phase error compensation is performed on adjacent subbands, the following steps 407 and 408 may be performed.

407: Perform bandwidth synthesis. Specifically, bandwidth synthesis may be performed on the echo signals of the plurality of subbands.

For example, after a constant phase error between the first range time-domain signal of the first subband and the second range time-domain signal of the second subband is obtained, and the first range time-domain signal or the second range time-domain signal is compensated based on the constant phase error, the compensated first range time-domain signal and the compensated second range time-domain signal may be synthesized and superimposed to obtain a fourth range time-domain signal. The fourth range time-domain signal does not include the constant phase error.

Figure 11:
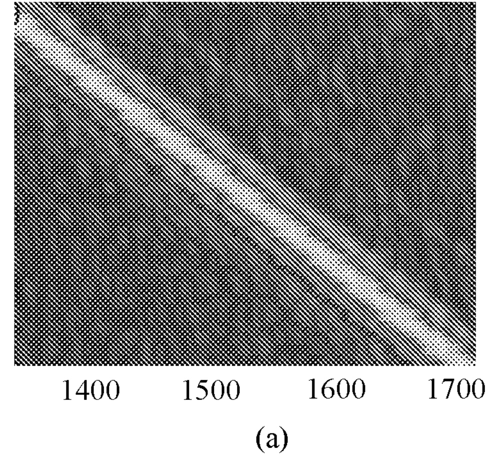
FIG. 11 is a schematic diagram of comparison between range pulse compression envelopes before and after bandwidth synthesis is performed on two subbands.
Figure 11:
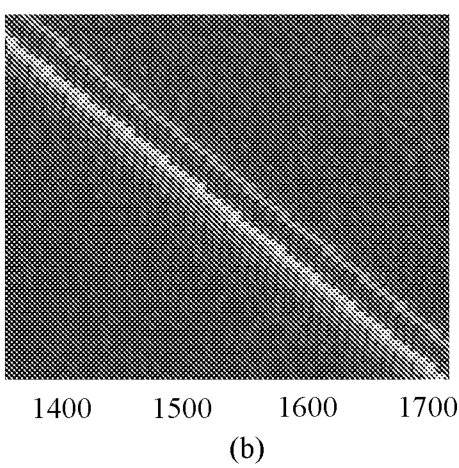

FIG. 11 is a schematic diagram of comparison between range pulse compression envelopes before and after bandwidth synthesis is performed on two subbands. (a) is a schematic diagram of a range pulse compression envelope of a single subband before bandwidth synthesis is performed on the subband. (b) is a schematic diagram of a range pulse compression envelope after bandwidth synthesis is performed on two subbands. It can be learned from FIG. 11 that envelopes of the two objects in (a) cannot be distinguished, but envelopes of two objects in (b) can be clearly distinguished. Therefore, after bandwidth synthesis, a resolution capability of a target can be improved.

408: Obtain a radar imaging map. Specifically, based on a bandwidth synthesis result, imaging processing may be performed to obtain the radar imaging map, for example, a SAR image. Because a constant phase error of adjacent subbands is compensated, it is possible to obtain a radar imaging map with a high range resolution.

Therefore, in this embodiment of this application, peak points corresponding to the main lobe or the left and right side lobes in the synthetic bandwidth signal are obtained, and the constant phase error between adjacent subbands is determined based on a mapping relationship between the peak points corresponding to the main lobe or the left and right side lobes and the constant phase error between adjacent subbands. Then, constant phase error compensation is performed on adjacent subbands based on the constant phase error between adjacent subbands, and bandwidth synthesis is performed on the compensated adjacent subbands, to obtain a radar imaging map with a high range resolution. In this embodiment of this application, because a process of determining the constant phase error does not relate to a common spectrum part of an overlapping subband of adjacent subbands, spectrum utilization can be improved and three modes are applicable: a subband overlapping mode, a subband adjacent mode, and a subband spacing mode.

Figure 12:
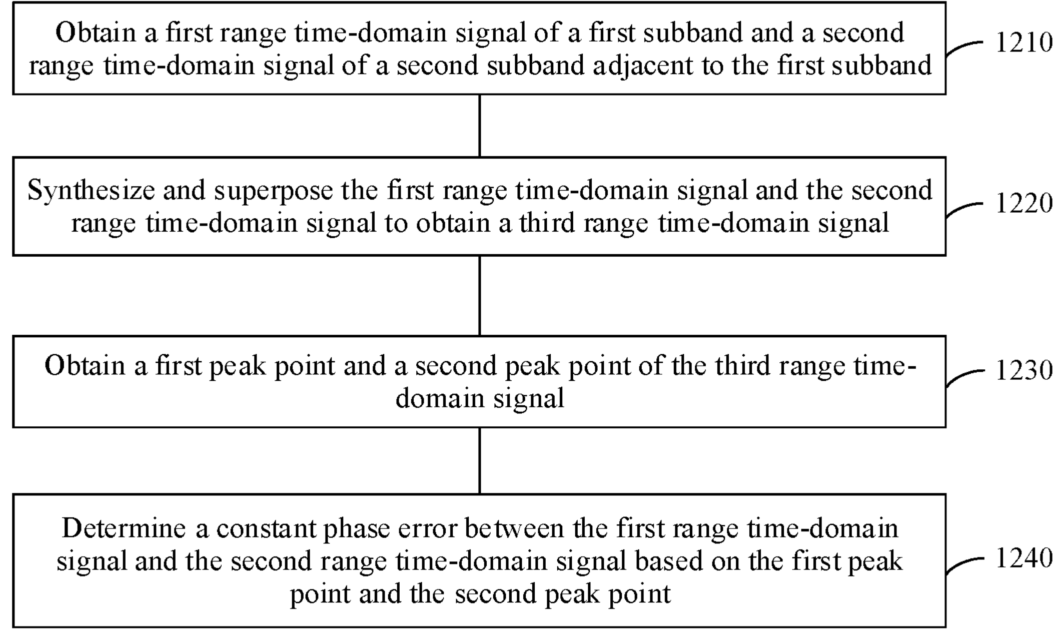
FIG. 12 is a schematic flowchart of a signal processing method according to an embodiment of this application.

FIG. 12 is a schematic flowchart of a signal processing method 1200 according to an embodiment of this application. For example, the method 1200 may be performed by a radar apparatus, for example, the radar apparatus 100 in FIG. 1 or the radar apparatus 300 in FIG. 3. Further, the method 1200 may be performed by a signal processing unit in the radar apparatus. Alternatively, in some other embodiments, the method 400 may be performed by a processing unit disposed outside the radar apparatus, for example, an in-vehicle computing system, or a cloud server. This is not limited in this application. As shown in FIG. 12, the method 1200 includes steps 1210 to 1240.

1210: Obtain a first range time-domain signal of a first subband and a second range time-domain signal of a second subband adjacent to the first subband.

For example, the first range time-domain signal of the first subband and the second range time-domain signal of the second subband may be obtained according to step 401 to step 405 in FIG. 4. The first range time-domain signal of the first subband is, for example, the signal represented by formula (1), and the second range time-domain signal of the second subband is, for example, the signal represented by formula (2). This is not limited in this embodiment of this application.

1220: Synthesize and superpose the first range time-domain signal and the second range time-domain signal to obtain a third range time-domain signal.

For example, correlation synthesis may be directly performed on the first range time-domain signal and the second range time-domain signal, to obtain a synthesis result. The synthesis result is the third range time-domain signal.

For example, the third range time-domain signal may be the signal represented by formula (3), (4), or (5). In this case, constant phase errors of the first range time-domain signal and the second range time-domain signal are compensated, and the compensation value is an independent variable $\theta$.

For another example, the third range time-domain signal may be formula (7) or (8).

1230: Obtain a first peak point and a second peak point of the third range time-domain signal.

For example, the first peak point may be a peak point corresponding to a main lobe, and the second peak point is a peak point corresponding to a second peak in the third range time-domain signal. The second peak may be a left adjacent side lobe or a right adjacent side lobe of the main peak. This is not limited.

In another example, the first peak point may be a peak point corresponding to a left adjacent side lobe of the main peak, and the second peak point may be a peak point corresponding to a right adjacent side lobe of the main peak.

1240: Determine a constant phase error 61, between the first range time-domain signal and the second range time-domain signal based on the first peak point and the second peak point, where $\theta_{err} \in [0,2\pi]$.

Therefore, in this embodiment of this application, range time-domain signals of adjacent subbands are synthesized and superposed to obtain a spliced synthetic bandwidth signal, and two peak points, for example, a first peak point and a second peak point, in the spliced synthetic bandwidth signal. Because the two peak points in the synthetic bandwidth signal are related to a constant phase between the two adjacent subbands before splicing, a constant phase error between the adjacent subbands can be obtained based on the two peak points in this embodiment of this application. In this embodiment of this application, because a process of determining the constant phase error does not relate to a common spectrum part of an overlapping subband of adjacent subbands, spectrum utilization can be improved and three modes are applicable: a subband overlapping mode, a subband adjacent mode, and a subband spacing mode.

In some possible implementations, the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal. In other words, the second peak point is a peak point corresponding to a second peak in the third range time-domain signal.

A specific implementation of determining the constant phase error $\theta_{err}$ between the first range time-domain signal and the second range time-domain signal based on the first peak point and the second peak point may be:

- determining a residual constant phase error $\Delta\theta$ of the third range time-domain signal based on a difference between the first peak point and the second peak point, where the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and
- determining the constant phase error $\theta_{err}$ based on the residual constant phase error $\Delta\theta$ and the first compensation value $\theta$.

In this implementation, the third range time-domain signal may be the signal represented by formula (3), (4), or (5).

There is a mapping relationship between the residual constant phase error $\Delta\theta$ and the difference between the first peak point and the second peak point. Because there is also a mapping relationship between the residual constant phase error $\Delta\theta$ and the constant phase error $\theta_{err}$, there is also a mapping relationship between the constant phase error $\theta_{err}$ and the difference between the first peak point and the second peak point. Herein, the mapping relationship between the constant phase error $\theta_{err}$ and the difference between the first peak point and the second peak point may be referred to as a main lobe splitting operation model. Specifically, for the main lobe splitting operation model, refer to descriptions of step 406 in FIG. 4. Details are not described herein again.

Therefore, in this embodiment of this application, a difference between a main lobe and a first side lobe (namely, a side lobe corresponding to the second peak) in the synthetic bandwidth signal is obtained, and a constant phase error $\theta_{err}$ between subbands is obtained based on a mapping relationship between the residual constant phase error $\Delta\theta$ and the difference between the main lobe and the first side lobe in the synthetic bandwidth signal, and the mapping relationship between the residual constant phase error $\Delta\theta$ and the constant phase error $\theta_{err}$, that is, based on a splitting main lobe inverse-operation model.

In some possible implementations, when the peak point corresponding to the first side lobe is on the left side of the peak point corresponding to the main lobe, a value range of the residual constant phase error $\Delta\theta$ is $[0,\pi]$. In other words, in this case, the first side lobe is a left adjacent side lobe of the main lobe.

When the peak point corresponding to the first side lobe is on the right side of the peak point corresponding to the main lobe, a value range of the residual constant phase error $\Delta\theta$ is $[\pi,2\pi]$. In other words, in this case, the first side lobe is a right adjacent side lobe of the main lobe.

In this way, the value range of the residual constant phase error $\Delta\theta$ may be further obtained based on a location of the first side lobe relative to the main lobe, that is, the first side lobe is a left adjacent side lobe or a right adjacent side lobe, to more accurately determine a corresponding residual constant phase error $\Delta\theta$ based on a difference between a peak point of the main lobe and a peak point of the first side lobe.

In some possible implementations, the determining a residual constant phase error $\Delta\theta$ of the third range time-domain signal based on a difference between the first peak point and the second peak point includes:

when a difference between the peak point corresponding to the main lobe of the third range time-domain signal and the peak point corresponding to the first side lobe is a minimum value, determining that the residual constant phase error $\Delta\theta$ is $\pi$. Herein, the minimum value of the difference includes that the difference is 0 and the difference is approximately 0. This is not limited in this embodiment of this application.

Therefore, in this embodiment of this application, the minimum value (that is, 0 or approximately 0) of the difference between the main lobe and the first side lobe in the synthetic bandwidth signal is obtained, and when the difference between the main lobe and the first side lobe in the synthetic bandwidth signal is the minimum value, the residual constant phase error $\Delta\theta$ is $\pi$. In this case, $\theta_{err}=\theta-\pi$. The constant phase error $\theta_{err}$ between subbands may be obtained by substituting a compensation value $\theta$ corresponding to the synthetic bandwidth signal.

In some possible implementations, the first peak point is a peak point corresponding to a left adjacent side lobe of a main lobe of the third range time-domain signal, and the second peak point is a peak point corresponding to a right adjacent side lobe of the main lobe of the third range time-domain signal.

A specific implementation of determining the constant phase error $\theta_{err}$ between the first range time-domain signal and the second range time-domain signal based on the first peak point and the second peak point may be:

determining the constant phase error $\theta_{err}$ based on a difference between the first peak point and the second peak point and a first mapping relationship between the difference and the constant phase error $\theta_{err}$.

In this implementation, the third range time-domain signal may be the signal represented by formula (7) or (8). Herein, the first mapping relationship between the constant phase error and the difference between the first peak point and the second peak point may be referred to as a left-right side lobe equalization model. Specifically, for the left-right side lobe equalization model, refer to descriptions of step 406 in FIG. 4. Details are not described herein again.

Therefore, in this embodiment of this application, after a difference between a left adjacent side lobe and a right adjacent side lobe of a main lobe in the synthetic bandwidth signal is obtained, a constant phase error $\theta_{err}$ between subbands is obtained based on a mapping relationship between the difference between the left adjacent side lobe and the right adjacent side lobe of the main lobe in the synthetic bandwidth signal and a constant phase error $\theta_{err}$ between adjacent subbands, that is, based on a left-right side lobe equalization model.

In some possible implementations, before the determining a constant phase error $\theta_{err}$ between the first range time-domain signal and the second range time-domain signal based on the first peak point and the second peak point, the method further includes:

obtaining a second mapping relationship between the left adjacent side lobe of the main lobe and the constant phase error $\theta_{err}$, for example, the mapping relationship represented by formula (9) or (11);

obtaining a third mapping relationship between the right adjacent side lobe of the main lobe and the constant phase error $\theta_{err}$, for example, the mapping relationship represented by formula (10) or (12); and determining the first mapping relationship based on the first mapping relationship and the second mapping relationship. For example, the difference between the left adjacent side lobe and the right adjacent side lobe may be calculated, and a mapping relationship between the difference and the constant phase error $\theta_{err}$ is the first mapping relationship, for example, the mapping relationship shown in formula (13).

Therefore, in this embodiment of this application, after the third range time-domain signal is obtained, the second mapping relationship between the left adjacent side lobe of the main lobe of the third range time-domain signal and the constant phase error $\theta_{err}$ and the third mapping relationship between the right adjacent side lobe of the main lobe of the third range time-domain signal and the constant phase error $\theta_{err}$ may be separately obtained. Then, the first mapping relationship is determined based on the second mapping relationship and the third mapping relationship.

In some possible implementations, the method further includes:

determining a constant phase error compensation function based on the constant phase error $\theta_{err}$;

compensating the first range time-domain signal or the second range time-domain signal based on the constant phase error compensation function; and synthesizing and superposing the compensated first range time-domain signal and the compensated second range time-domain signal to obtain a fourth range time-domain signal.

Therefore, in this embodiment of this application, after the constant phase error between the adjacent subbands is compensated, the adjacent subbands may be compensated based on the constant phase error, and bandwidth synthesis is performed on the compensated adjacent subbands, to obtain a radar imaging map with a high range resolution. In this embodiment of this application, because a process of determining the constant phase error does not relate to a common spectrum part of an overlapping subband of adjacent subbands, according to the bandwidth synthesis solution, spectrum utilization can be improved and three modes are applicable: a subband overlapping mode, a subband adjacent mode, and a subband spacing mode.

In some possible implementations, before the synthesizing and superposing the first range time-domain signal and the second range time-domain signal to obtain a third range time-domain signal, the method further includes:

separately performing channel amplitude calibration on the first range time-domain signal and the second range time-domain signal, for example, step 402 in FIG. 4;

rearranging the first range time-domain signal and the second range time-domain signal based on a carrier frequency sequence, for example, step 403 in FIG. 4;

separately compensating intra-subband higher-order phase errors of the first range time-domain signal and the second range time-domain signal, for example, step 404 in FIG. 4; and compensating a first-order phase error between the first range time-domain signal and the second range time-domain signal, for example, step 405 in FIG. 4.

In this embodiment of this application, amplitude-phase characteristics of the adjacent subbands are calibrated, signals of the adjacent subbands are rearranged based on a carrier frequency sequence, and a higher-order phase error in the adjacent subbands and a first-order phase error between the adjacent subbands are compensated, so that there is only the constant phase error between the adjacent subbands before the constant phase error between the adjacent subbands is obtained. Therefore, in this embodiment of this application, the constant phase error between the adjacent subbands can be accurately obtained based on a mapping relationship between a related peak point of a bandwidth synthesized result and the residual constant phase error.

Figure 13:
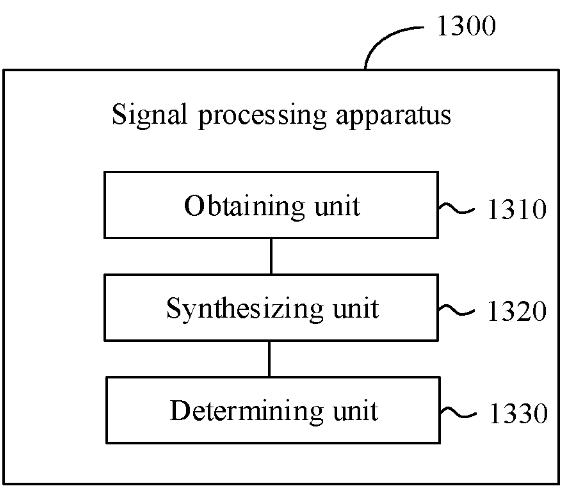
FIG. 13 is a schematic block diagram of a signal processing apparatus according to an embodiment of this application.

An embodiment of this application further provides a signal processing apparatus. Refer to FIG. 13. For example, the signal processing apparatus 1300 may be a radar apparatus, or a signal processing unit disposed in the radar apparatus, or a processing unit outside the radar apparatus, for example, an in-vehicle computing system, or a cloud server. In this embodiment of this application, the apparatus 1300 may include an obtaining unit 1310, a synthesizing unit 1320, and a determining unit 1330.

The obtaining unit 1310 is configured to obtain a first range time-domain signal of a first subband and a second range time-domain signal of a second subband adjacent to the first subband.

The synthesizing unit 1320 is configured to synthesize and superpose the first range time-domain signal and the second range time-domain signal to obtain a third range time-domain signal.

The obtaining unit 1320 is further configured to obtain a first peak point and a second peak point of the third range time-domain signal.

The determining unit 1330 is configured to determine a constant phase error $\theta_{err}$ between the first range time-domain signal and the second range time-domain signal based on the first peak point and the second peak point, where $\theta_{err} \in [0,2\pi]$.

In some optional embodiments, the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal.

The determining unit 1330 is specifically configured to:

determine a residual constant phase error $\Delta\theta$ of the third range time-domain signal based on a difference between the first peak point and the second peak point, where the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and determine the constant phase error $\theta_{err}$ based on the residual constant phase error $\Delta\theta$ and the first compensation value $\theta$.

In some optional embodiments, when the peak point corresponding to the first side lobe is on the left side of the peak point corresponding to the main lobe, a value range of the residual constant phase error $\Delta\theta$ is $[0, \pi]$.

When the peak point corresponding to the first side lobe is on the right side of the peak point corresponding to the main lobe, a value range of the residual constant phase error $\Delta\theta$ is $[\pi,2\pi]$.

In some optional embodiments, the determining unit 1330 is specifically configured to:

when a difference between the peak point corresponding to the main lobe of the third range time-domain signal and the peak point corresponding to the first side lobe is a minimum value, determine that the residual constant phase error $\Delta\theta$ is $\pi$.

In some optional embodiments, the first range time-domain signal is represented by the following formula:

$$R_i(t_q) = \sin c\ (\gamma T t_q) e^{-j\pi\gamma T t_q}$$

The second range time-domain signal is represented by the following formula:

$$R_{i+1}(t_q) = \sin c\ (\gamma T t_q) e^{j\pi\gamma T t_q} e^{j\theta_{err}}$$

The third range time-domain signal is shown in the following formula:

$$R_d(t_q;\theta) = \left(1 + e^{j(\theta-\theta_{err})}\right)\cdot r_1(t_q) - j\cdot\left(1 - e^{j(\theta-\theta_{err})}\right)\cdot r_2(t_q)$$

$r_1(t_q)=\sin c(2\gamma T t_q)$, $r_2(t_q)=\sin c(\gamma T t_q)\sin(\pi\gamma T t_q)$, $R_d(t_q;\theta)$ represents the third range time-domain signal, $R_i(t_q)$ represents a range time-domain signal of an $i^{th}$ subband at a range moment $t_q$, $i \in [1, I]$, I represents a quantity of subbands on which bandwidth synthesis needs to be performed, $q \in [1, Q]$ represents a range discrete sampling moment, Q represents a total range discrete sampling moment, sin $c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

In some optional embodiments, the first peak point is a peak point corresponding to a left adjacent side lobe of a main lobe of the third range time-domain signal, and the second peak point is a peak point corresponding to a right adjacent side lobe of the main lobe of the third range time-domain signal.

The determining unit 1330 is specifically configured to:

determine the constant phase error $\theta_{err}$ based on a difference between the first peak point and the second peak point and a first mapping relationship between the difference and the constant phase error $\theta_{err}$.

In some optional embodiments, the obtaining unit 1310 is further configured to:

obtain a second mapping relationship between the left adjacent side lobe of the main lobe and the constant phase error $\theta_{err}$;

obtain a third mapping relationship between the right adjacent side lobe of the main lobe and the constant phase error $\theta_{err}$; and determine the first mapping relationship based on the first mapping relationship and the second mapping relationship.

In some optional embodiments, the first mapping relationship is shown in the following formula:

$$\theta_{err} = \frac{P(\theta_{err})}{|P(\theta_{err})|} \cdot \arccos\left(1 - \frac{9\pi^2}{32} P^2(\theta_{err})\right)$$

$P(\theta_{err})$ represents the difference between the first peak point and the second peak point.

In some optional embodiments, the first range time-domain signal is represented by the following formula:

$$R_i(t_q) = \sin c\ (\gamma T t_q) e^{-j\pi\gamma T t_q}$$

The second range time-domain signal is represented by the following formula:

$$R_{i+1}(t_q) = \sin c\ (\gamma T t_q) e^{j\pi\gamma T t_q} e^{j\theta_{err}}$$

The third range time-domain signal is shown in the following formula:

$$Q(t_q) = R_j(t_q) + R_{j+1}(t_q) = \sin c\ (\gamma T t_q) e^{-j\pi\gamma T t_q} + \sin c\ (\gamma T t_q) e^{j\pi\gamma T t_q} e^{j\theta_{err}}$$

The left adjacent side lobe $Q_l(\theta_{err})$ of the main lobe of the third range time-domain signal meets the following formula:

$$Q_l(\theta_{err}) = -\frac{2}{3\pi}(1 - j) - \frac{2}{3\pi}(1 + j)\exp(j\theta_{err})$$

The right adjacent side lobe $Q_r(\theta_{err})$ of the main lobe of the third range time-domain signal meets the following formula:

$$Q_r(\theta_{err}) = -\frac{2}{3\pi}(1 + j) - \frac{2}{3\pi}(1 - j)\exp(j\theta_{err})$$

$Q(t_q)$ represents the third range time-domain signal, $R_i(t_q)$ represents a range time-domain signal of an $i^{th}$ subband at a range moment $t_q$, $i \in [1, I]$, I represents a quantity of subbands on which bandwidth synthesis needs to be performed, $q \in [1, Q]$ represents a range discrete sampling moment, Q represents a total range discrete sampling moment, sin $c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

In some optional embodiments, the determining unit 1330 is further configured to determine a constant phase error compensation function based on the constant phase error $\theta_{err}$.

The apparatus 1300 further includes a compensation unit, configured to compensate the first range time-domain signal or the second range time-domain signal based on the constant phase error compensation function.

The combining unit 1320 is further configured to synthesize and superpose the compensated first range time-domain signal and the compensated second range time-domain signal to obtain a fourth range time-domain signal.

In some feasible embodiments, the apparatus 1300 further includes:

a channel amplitude calibration unit, configured to separately perform channel amplitude calibration on the first range time-domain signal and the second range time-domain signal;

a spectrum shifting unit, configured to rearrange the first range time-domain signal and the second range time-domain signal based on a carrier frequency sequence;

a higher-order phase error compensation unit, configured to separately compensate intra-subband higher-order phase errors of the first range time-domain signal and the second range time-domain signal; and a first-order phase error compensation unit, configured to compensate a first-order phase error between the first range time-domain signal and the second range time-domain signal.

Figure 14:
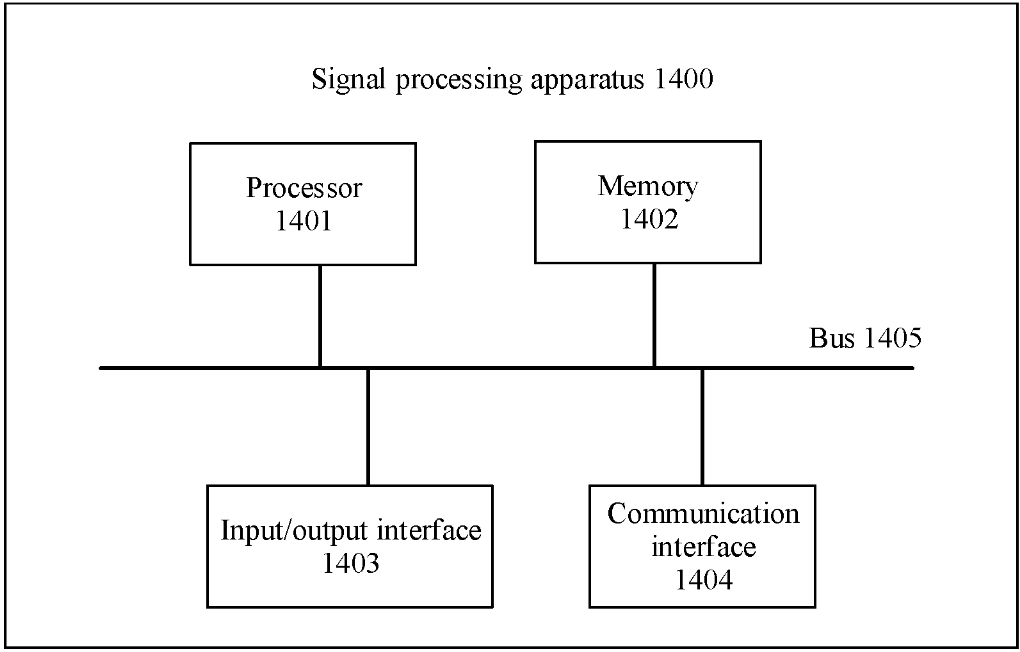
FIG. 14 is a schematic block diagram of another signal processing apparatus according to an embodiment of this application.

FIG. 14 is a schematic diagram of a hardware structure of a signal processing apparatus 1400 according to an embodiment of this application. The apparatus 1400 shown in FIG. 14 may be considered as a computer device. The apparatus 1400 may be used as an implementation of the signal processing apparatus in embodiments of this application, or may be used as an implementation of the signal processing method in embodiments of this application. The apparatus 1400 includes a processor 1401. Optionally, the apparatus 1400 may further include a memory 1402, an input/output interface 1403, a communication interface 1404, and a bus 1405. The processor 1401, the memory 1402, the input/output interface 1403, and the communication interface 1404 may be communicatively connected to each other by using the bus 1405.

The processor 1401 may be a general-purpose central processing unit (central processing unit, CPU), a microprocessor, an application-specific integrated circuit (application-specific integrated circuit, ASIC), or one or more integrated circuits, and is configured to execute a related program, to implement functions that need to be performed by modules in the signal processing apparatus in embodiments of this application, or perform the signal processing method in the method embodiments of this application. The processor 1401 may be an integrated circuit chip and has a signal processing capability. In an implementation process, each step in the foregoing methods may be performed by using a hardware integrated logical circuit in the processor 1401 or an instruction in a form of software. The processor 1401 may be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1402. The processor 1401 reads information from the memory 1402, and implements, in combination with the hardware of the processor 1401, the functions that need to be performed by the modules included in the signal processing apparatus in embodiments of this application, or performs the signal processing method in method embodiments of this application.

The memory 1402 may be a read-only memory (read-only memory, ROM), a static storage device, a dynamic storage device, or a random access memory (random access memory, RAM). The memory 1402 may store an operating system and another application program. When software or firmware is used to implement the functions that need to be executed by the modules included in the signal processing apparatus in embodiments of this application, or to execute the signal processing method in method embodiments of this application, program code used to implement the technical solutions provided in embodiments of this application is stored in the memory 1402, and the processor 1401 performs operations that need to be performed by the modules included in the signal processing apparatus, or performs the signal processing method provided in method embodiments of this application.

The input/output interface 1403 is configured to receive input data and information, and output data such as an operation result.

The communication interface 1404 implements communication between the apparatus 1400 and another device or a communication network by using a transceiver apparatus such as but not limited to a transceiver. The communication interface 1404 may be used as an obtaining module or a sending module in a processing apparatus.

The bus 1405 may include a path for transmitting information between components (for example, the processor 1401, the memory 1402, the input/output interface 1403, and the communication interface 1404) of the apparatus 1400.

It should be noted that, although only the processor 1401, the memory 1402, the input/output interface 1403, the communication interface 1404, and the bus 1405 that are of the apparatus 1400 are shown in FIG. 14, in a specific implementation process, a person skilled in the art should understand that the apparatus 1400 further includes another device for implementing normal running, for example, may further include a display configured to display a radar imaging map. In addition, based on a specific requirement, a person skilled in the art should understand that the apparatus 1400 may further include a hardware device for implementing other additional functions. In addition, a person skilled in the art should understand that the apparatus 1400 may include only components required for implementing this embodiment of this application, but not necessarily include all the components shown in FIG. 14.

The signal processing apparatus 1300 or apparatus 1400 may be a vehicle having a radar signal processing function, or another component having a radar signal processing function. The signal processing apparatus 1300 or apparatus 1400 includes but is not limited to another sensor such as a vehicle-mounted terminal, a vehicle-mounted controller, an in-vehicle module, an automobile module, an in-vehicle component, an in-vehicle chip, an in-vehicle unit, a vehicle-mounted radar, or a vehicle-mounted camera. The vehicle may implement the method provided in this application by using the vehicle-mounted terminal, the vehicle-mounted controller, the in-vehicle module, the automobile module, the in-vehicle component, the in-vehicle chip, the in-vehicle unit, the vehicle-mounted radar, or the vehicle-mounted camera.

The signal processing apparatus 1300 or apparatus 1400 may be another intelligent terminal having a radar signal processing function other than the vehicle, or disposed in another intelligent terminal having a radar signal processing function other than the vehicle, or disposed in a component of the intelligent terminal. The intelligent terminal may be another terminal device such as an intelligent transportation device, a smart home device, or a robot. The signal processing apparatus 1300 or the apparatus 1400 includes but is not limited to an intelligent terminal or a controller in the intelligent terminal, a chip, another sensor such as a radar or a camera, another component, and the like.

The signal processing apparatus 1300 or the apparatus 1400 may be a general-purpose device or a dedicated device. During specific implementation, the apparatus may be a desktop computer, a portable computer, a network server, a palmtop computer (personal digital assistant, PDA), a mobile phone, a tablet computer, a wireless terminal device, an embedded device, or another device having a processing function. A type of the apparatus is not limited in this embodiment of this application.

The signal processing apparatus 1300 or the apparatus 1400 may alternatively be a chip or a processor having a processing function. The signal processing apparatus 1300 or the apparatus 1400 may include a plurality of processors. The processor may be a single-core processor (single-CPU), or may be a multi-core processor (multi-CPU). The chip or processor having a processing function may be disposed in a sensor, or may not be disposed in the sensor, but disposed at a receive end of an output signal of the sensor.

An embodiment of this application further provides a radar system, configured to provide a radar signal processing function for a vehicle. The radar system includes at least one signal processing apparatus mentioned in the foregoing embodiments of this application. The at least one signal processing apparatus in the system may be integrated into an entire system or a device, or the at least one signal processing apparatus in the system may be independently disposed as an element or an apparatus.

An embodiment of this application further provides a sensor system, configured to provide a radar signal processing function for a vehicle. The sensor system includes at least one signal processing apparatus mentioned in the foregoing embodiments of this application, and at least one of a camera, a laser radar, and other sensors. The at least one sensor apparatus in the system may be integrated into an entire system or a device, or the at least one sensor apparatus in the system may be independently disposed as an element or an apparatus.

An embodiment of this application further provides a system, applied to unmanned driving or intelligent driving. The system includes at least one of the signal processing apparatus, a camera, and another sensor such as a radar that are mentioned in the foregoing embodiments of this application. The at least one apparatus in the system may be integrated into an entire system or a device, or the at least one apparatus in the system may be independently disposed as an element or an apparatus.

Further, any one of the foregoing systems may interact with a central controller of a vehicle to provide detection and/or fusion information for decision or control of driving of the vehicle.

An embodiment of this application further provides a vehicle. The vehicle includes at least one signal processing apparatus mentioned in the foregoing embodiments of this application, or includes any one of the foregoing systems.

An embodiment of this application further provides a computer-readable storage medium. The computer-readable storage medium includes a computer program. When the computer program is run on a computer, the computer is enabled to perform the methods provided in the foregoing method embodiments.

An embodiment of this application further provides a computer program product including instructions. When the computer program product runs on a computer, the computer is enabled to perform the methods provided in the foregoing method embodiments.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

It should be understood that, descriptions such as "first" and "second" in embodiments of this application are only used as examples and used to distinguish between objects, but do not indicate a sequence or indicate a specific limitation on a quantity of devices in embodiments of this application, and cannot constitute any limitation on embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, comprising:

transmitting, by a radar, radar signals of a plurality of subbands including a first subband and a second subband adjacent to the first subband;

obtaining, by the radar, a first range time-domain signal of the first subband and a second range time-domain signal of the second subband;

synthesizing and superposing, by the radar, the first range time-domain signal and the second range time-domain signal to obtain a third range time-domain signal;

obtaining, by the radar, a first peak point and a second peak point of the third range time-domain signal, wherein the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal;

determining, by the radar, a constant phase error $\theta_{err}$ between the first range time-domain signal and the second range time-domain signal based on the first peak point and the second peak point, wherein $\theta_{err} \in [0,2\pi]$; and obtaining, by the radar, a radar imaging map based on the first range time-domain signal, the second range time-domain signal, and the constant phase error $\theta_{err}$.

2. The method according to claim 1, wherein the determining a constant phase error $\theta_{err}$ between the first range time-domain signal and the second range time-domain signal based on the first peak point and the second peak point comprises:

determining a residual constant phase error $\Delta\theta$ of the third range time-domain signal based on a difference between the first peak point and the second peak point, wherein the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and determining the constant phase error $\theta_{err}$ based on the residual constant phase error $\Delta\theta$ and the first compensation value $\theta$.

3. The method according to claim 2, wherein when the peak point corresponding to the first side lobe is on the left side of the peak point corresponding to the main lobe, a value range of the residual constant phase error $\Delta\theta$ is $[0, \pi]$; or when the peak point corresponding to the first side lobe is on the right side of the peak point corresponding to the main lobe, a value range of the residual constant phase error $\Delta\theta$ is $[\pi, 2\pi]$.

4. The method according to claim 2, wherein the determining a residual constant phase error $\Delta\theta$ of the third range time-domain signal based on a difference between the first peak point and the second peak point comprises:

in response to that a difference between the peak point corresponding to the main lobe of the third range time-domain signal and the peak point corresponding to the first side lobe is a minimum value, determining that the residual constant phase error $\Delta\theta$ is $\pi$.

5. The method according to claim 2, wherein the first range time-domain signal is represented by the following formula:

$$R_i(t_q) = \sin\ c\ (\gamma T t_q) e^{-j\pi\gamma T t_q};$$

the second range time-domain signal is represented by the following formula:

$$R_{i+1}(t_q) = \sin\ c\ (\gamma T t_q) e^{j\pi\gamma T t_q} e^{j\theta_{err}};$$

and the third range time-domain signal is represented by the following formula:

$$R_d(t_q;\theta) = \left(1 + e^{j(\theta-\theta_{err})}\right)\cdot r_1(t_q) - j\cdot\left(1 - e^{j(\theta-\theta_{err})}\right)\cdot r_2(t_q),$$

wherein $r_1(t_q)=\sin c(2\gamma T t_q)$, $r_2(t_q)=\sin c(\gamma T t_q)\sin(\pi\gamma T t_q)$, $R_d(t_q;\theta)$ represents the third range time-domain signal, $R_i(t_q)$ represents a range time-domain signal of an $i^{th}$ subband at a range moment $t_q$, $i \in [1, I]$, I represents a quantity of subbands on which bandwidth synthesis needs to be performed, $q \in [1, Q]$ represents a range discrete sampling moment, Q represents a total range discrete sampling moment, $\sin c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

6. The method according to claim 1, further comprising:

determining a constant phase error compensation function based on the constant phase error $\theta_{err}$;

compensating the first range time-domain signal and the second range time-domain signal based on the constant phase error compensation function; and synthesizing and superposing the compensated first range time-domain signal and the compensated second range time-domain signal to obtain a fourth range time-domain signal.

7. The method according to claim 1, wherein before the synthesizing and superposing the first range time-domain signal and the second range time-domain signal to obtain a third range time-domain signal, the method further comprises:

separately performing channel amplitude calibration on the first range time-domain signal and the second range time-domain signal;

rearranging the first range time-domain signal and the second range time-domain signal based on a carrier frequency sequence;

separately compensating intra-subband higher-order phase errors of the first range time-domain signal and the second range time-domain signal; and compensating a first-order phase error between the first range time-domain signal and the second range time-domain signal.

8. An apparatus, comprising:

at least one memory configured to store instructions; and at least one processor coupled to the at least one memory, wherein the instructions are for execution by the at least one processor to cause the apparatus to:

transmit radar signals of a plurality of subbands including a first subband and a second subband adjacent to the first subband;

obtain a first range time-domain signal of the first subband and a second range time-domain signal of the second subband;

synthesize and superposing the first range time-domain signal and the second range time-domain signal to obtain a third range time-domain signal;

obtain a first peak point and a second peak point of the third range time-domain signal, wherein the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal;

determine a constant phase error $\theta_{err}$ between the first range time-domain signal and the second range time-domain signal based on the first peak point and the second peak point, wherein $\theta_{err} \in [0,2\pi]$; and obtain a radar imaging map based on the first range time-domain signal, the second range time-domain signal, and the constant phase error $\theta_{err}$.

9. The apparatus according to claim 8, wherein the determine a constant phase error $\theta_{err}$ between the first range time-domain signal and the second range time-domain signal based on the first peak point and the second peak point comprises:

determine a residual constant phase error $\Delta\theta$ of the third range time-domain signal based on a difference between the first peak point and the second peak point, wherein the third range time-domain signal is obtained by compensating the constant phase error $\theta_{err}$, with a first compensation value $\theta$, $\Delta\theta=\theta-\theta_{err}$, $\Delta\theta \in [0,2\pi]$, and $\theta \in [0,2\pi]$; and determine the constant phase error $\theta_{err}$ based on the residual constant phase error 40 and the first compensation value $\theta$.

10. The apparatus according to claim 9, wherein when the peak point corresponding to the first side lobe is on the left side of the peak point corresponding to the main lobe, a value range of the residual constant phase error $\Delta\theta$ is $[0, \pi]$; or when the peak point corresponding to the first side lobe is on the right side of the peak point corresponding to the main lobe, a value range of the residual constant phase error $\Delta\theta$ is $[\pi, 2\pi]$.

11. The apparatus according to claim 9, wherein the determine a residual constant phase error $\Delta\theta$ of the third range time-domain signal based on a difference between the first peak point and the second peak point comprises:

in response to that a difference between the peak point corresponding to the main lobe of the third range time-domain signal and the peak point corresponding to the first side lobe is a minimum value, determining that the residual constant phase error $\Delta\theta$ is $\pi$.

12. The apparatus according to claim 9, wherein the first range time-domain signal is represented by the following formula:

$$R_i(t_q) = \sin\ c\ (\gamma T t_q) e^{-j\pi\gamma T t_q};$$

the second range time-domain signal is represented by the following formula:

$$R_{i+1}(t_q) = \sin\ c\ (\gamma T t_q) e^{j\pi\gamma T t_q} e^{j\theta_{err}};$$

and the third range time-domain signal is represented by the following formula:

$$R_d(t_q;\theta) = \left(1 + e^{j(\theta-\theta_{err})}\right)\cdot r_1(t_q) - j\cdot\left(1 - e^{j(\theta-\theta_{err})}\right)\cdot r_2(t_q),$$

wherein $r_1(t_q)=\sin c(2\gamma T t_q)$, $r_2(t_q)=\sin c(\gamma T t_q)\sin(\pi\gamma T t_q)$, $R_d(t_q;\theta)$ represents the third range time-domain signal, $R_i(t_q)$ represents a range time-domain signal of an $i^{th}$ subband at a range moment $t_q$, $i\in[1, I]$, I represents a quantity of subbands on which bandwidth synthesis needs to be performed, $q\in[1, Q]$ represents a range discrete sampling moment, Q represents a total range discrete sampling moment, $\sin c(\gamma T t_q)$ represents a signal range envelope signal, $\gamma$ represents a range chirp slope, T represents a radar transmission time period, $e^{j\pi\gamma T t_q}$ represents signal range phase information, and $e^{j\theta_{err}}$ represents inter-subband signal range phase error information.

13. The apparatus according to claim 8, wherein the instructions are for execution by the at least one processor to cause the apparatus to:

determine a constant phase error compensation function based on the constant phase error $\theta_{err}$;

compensate the first range time-domain signal and the second range time-domain signal based on the constant phase error compensation function; and synthesize and superpose the compensated first range time-domain signal and the compensated second range time-domain signal to obtain a fourth range time-domain signal.

14. The apparatus according to claim 8, wherein the instructions are for execution by the at least one processor to cause the apparatus to:

separately perform channel amplitude calibration on the first range time-domain signal and the second range time-domain signal;

rearrange the first range time-domain signal and the second range time-domain signal based on a carrier frequency sequence;

separately compensate intra-subband higher-order phase errors of the first range time-domain signal and the second range time-domain signal; and compensate a first-order phase error between the first range time-domain signal and the second range time-domain signal.

15. A non-transitory computer-readable storage media comprising instructions which, when executed by one or more processors of a radar, cause the one or more processors to perform operations comprising:

transmitting radar signals of a plurality of subbands including a first subband and a second subband adjacent to the first subband;

obtaining a first range time-domain signal of the first subband and a second range time-domain signal of the second subband;

synthesizing and superposing the first range time-domain signal and the second range time-domain signal to obtain a third range time-domain signal;

obtaining a first peak point and a second peak point of the third range time-domain signal, wherein the first peak point is a peak point corresponding to a main lobe of the third range time-domain signal, the second peak point is a peak point corresponding to a first side lobe adjacent to a main peak of the third range time-domain signal, and the peak point corresponding to the first side lobe is higher than a peak point corresponding to a second side lobe adjacent to the main peak of the third range time-domain signal;

determining a constant phase error $\theta_{err}$ between the first range time-domain signal and the second range time-domain signal based on the first peak point and the second peak point, wherein $\theta_{err} \in [0,2\pi]$; and obtaining a radar imaging map based on the first range time-domain signal, the second range time-domain signal, and the constant phase error $\theta_{err}$.

16. The non-transitory computer-readable storage media according to claim 15, wherein the determining a constant phase error $\theta_{err}$, between the first range time-domain signal and the second range time-domain signal based on the first peak point and the second peak point comprises:

determining a residual constant phase error $\Delta\theta$ of the third range time-domain signal based on a difference between the first peak point and the second peak point, wherein the third range time-domain signal is obtained by compensating the constant phase error $\theta_{err}$ with a first compensation value $\theta$, $\Delta\theta=\theta-\theta_{err}$, $\Delta\theta \in [0,2\pi]$, and $\theta \in [0,2\pi]$; and determining the constant phase error $\theta_{err}$ based on the residual constant phase error $\Delta\theta$ and the first compensation value $\theta$.

17. The non-transitory computer-readable storage media according to claim 16, wherein when the peak point corresponding to the first side lobe is on the left side of the peak point corresponding to the main lobe, a value range of the residual constant phase error $\Delta\theta$ is $[0, \pi]$; or when the peak point corresponding to the first side lobe is on the right side of the peak point corresponding to the main lobe, a value range of the residual constant phase error $\Delta\theta$ is $[\pi, 2\pi]$.

18. The non-transitory computer-readable storage media according to claim 16, wherein the determining a residual constant phase error $\Delta\theta$ of the third range time-domain signal based on a difference between the first peak point and the second peak point comprises:

in response to that a difference between the peak point corresponding to the main lobe of the third range time-domain signal and the peak point corresponding to the first side lobe is a minimum value, determining that the residual constant phase error $\Delta\theta$ is $\pi$.

19. The non-transitory computer-readable storage media according to claim 16, wherein the first range time-domain signal is represented by the following formula:

$$R_i(t_q) = \sin\ c\ (\gamma T t_q) e^{-j\pi\gamma T t_q};$$

the second range time-domain signal is represented by the following formula:

$$R_{i+1}(t_q) = \sin\ c\ (\gamma T t_q) e^{j\pi\gamma T t_q} e^{j\theta_{err}};$$

and the third range time-domain signal is represented by the following formula:

$$R_d(t_q; \theta) = \left(1 + e^{j(\theta-\theta_{err})}\right) \cdot r_1(t_q) - j \cdot \left(1 - e^{j(\theta-\theta_{err})}\right) \cdot r_2(t_q),$$

wherein $r_1(t_q)=\sin\ c(2\gamma T t_q)$, $r_2(t_q)=\sin\ c(\gamma T t_q)\ \sin\ c(\pi\gamma T t_q)$, $R_d(t_q; \theta)$ represents the third range time-domain signal, $R_i(t_q)$ represents a range time-domain signal of an $i^{th}$ subband at a range moment $t_q$, $i \in [1, I]$, I represents a quantity of subbands on which bandwidth synthesis needs to be performed, $q \in [1, Q]$ represents a range discrete sampling moment, Q represents a total range discrete sampling moment, $\sin\ c(\gamma T t_q)$ represents a signal range envelope signal, $\gamma$ represents a range chirp slope, T represents a radar transmission time period, $e^{j\pi\gamma T t_q}$ represents signal range phase information, and $e^{j\pi_{err}}$ represents inter-subband signal range phase error information.

20. The non-transitory computer-readable storage media according to claim 15, the operations further comprising:

determining a constant phase error compensation function based on the constant phase error $\theta_{err}$;

compensating the first range time-domain signal and the second range time-domain signal based on the constant phase error compensation function; and synthesizing and superposing the compensated first range time-domain signal and the compensated second range time-domain signal to obtain a fourth range time-domain signal.

* * * * *